United States Patent
Centonza et al.

(10) Patent No.: US 10,129,775 B2
(45) Date of Patent: Nov. 13, 2018

(54) METHOD IN A FIRST RADIO BASE STATION FOR HANDLING RE-ESTABLISHMENT OF A CONNECTION DUE TO RADIO LINK FAILURE

(71) Applicant: Telefonaktiebolaget LM Ericsson (publ), Stockholm (SE)

(72) Inventors: Angelo Centonza, Stockholm (SE); Icaro L. J. Da Silva, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 144 days.

(21) Appl. No.: 15/024,447

(22) PCT Filed: Sep. 16, 2014

(86) PCT No.: PCT/SE2014/051068
§ 371 (c)(1),
(2) Date: Mar. 24, 2016

(87) PCT Pub. No.: WO2015/060763
PCT Pub. Date: Apr. 30, 2015

(65) Prior Publication Data
US 2016/0242049 A1     Aug. 18, 2016

Related U.S. Application Data

(60) Provisional application No. 61/883,271, filed on Sep. 27, 2013.

(51) Int. Cl.
*H04W 36/30* (2009.01)
*H04W 24/04* (2009.01)
(Continued)

(52) U.S. Cl.
CPC .......... *H04W 24/04* (2013.01); *H04W 24/02* (2013.01); *H04W 36/0044* (2013.01);
(Continued)

(58) Field of Classification Search
CPC ............................. H04W 36/30; H04W 36/24
See application file for complete search history.

(56) References Cited

U.S. PATENT DOCUMENTS

2010/0234027 A1* 9/2010 Han ................ H04W 36/0083
455/436
2014/0056243 A1* 2/2014 Pelletier ............... H04W 74/04
370/329

OTHER PUBLICATIONS

3GPP TS 36.300 v12.0.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)—Dec. 2013.

(Continued)

*Primary Examiner* — Hassan Phillips
*Assistant Examiner* — Prenell Jones
(74) *Attorney, Agent, or Firm* — Baker Botts, LLP

(57) ABSTRACT

Embodiments herein relates to a method in a first radio base station (12) for handling communication in a radio communications network (1), which first radio base station (12) is comprised in the radio communications network (1). The first radio base station (12) receives a report of a radio link failure, RLF, of a wireless device (10), from the wireless device (10), which report comprises an identity of a first cell (11) for re-establishing connection in. The first radio base station (12) compares the identity of the first cell (11) in the received report with a cell identity of a current cell the wireless device (10) is currently connected to. In case the identities do not match, the first radio base station (12) discards the report of an RLF, increments a counter counting a number of times that the first cell was reported as a reestablishment cell and not being a current cell to which the wireless device (10) is currently connected to, and reports a report of an event to an Operation and Maintenance, O&M, (Continued)

node (15), which report of an event comprises the number of the counter.

28 Claims, 15 Drawing Sheets

(51) Int. Cl.
*H04W 76/19* (2018.01)
*H04W 24/02* (2009.01)
*H04W 36/00* (2009.01)
*H04W 36/04* (2009.01)

(52) U.S. Cl.
CPC ....... *H04W 36/0083* (2013.01); *H04W 36/04* (2013.01); *H04W 76/19* (2018.02)

(56) References Cited

OTHER PUBLICATIONS

PCT Notification of Transmittal of the International Search Report and the Written Opinion of the International Searching Authority, or the Declaration for International application No. PCT/SE2014/051068—Feb. 10, 2015.
3GPP TS 32.425 v.12.0.0; Technical Specification; 3rd Generation Partnership Project; Technical Specification Group Services and System Aspects; Telecommunication management; Performance Management (PM); Performance measurements; Evolved Universal Terrestrial Radio Access Network (E-UTRAN) (Release 12)—Jun. 2013.
3GPP TS 36.331 v12.0.0; Technical Specification; 3rd Generation Partnership Project; Technical Specification group Radio Access Network; Evolved Universal Terrestrial Radio Access (E-UTRA); Radio Resource Control (RRC); Protocol specification (Release12)—Dec. 2013.
3GPP TSG-RAN WG3 Meeting #80; Fukuoka, Japan; Source: Fujitsu; Title: MRO impacted by the failed RRC connection re-establishment (R3-130861) May 20-24, 2013.
3GPP TSG-RAN WG3 Meeting #81; Barcelona, Spain; Title: Impact on MRO from RRC re-establishment; Source: Huawei, Fujitsu, CATT (R3-131285)—Aug. 19, 23, 2013.
3GPP TSG-RAN WG3 Meeting #83; Prague, Checz Republique; Title: Solution proposal for the Impact on MRO from RRC re-establishment; Source: Ericsson (R3-140320)—Feb. 10-14, 2014.
3GPP TSG-RAN WG3 Meeting #85; Dresden, Germany; Title: Solution proposal for MRO RRC re-establishment; Source: Ericsson (R3-141954)—Aug. 18-22, 2014.
PCT Written Opinion of the International Searching Authority for International application No. PCT/SE2014/051068—Feb. 10, 2015.
3GPP TS 36.423 v12.0.0; Technical Specification; 3rd Generation Partnership Project; Technical Specification Group Radio Access Network; Evolved Universal Terrestrial Radio Access Network (E-UTRAN); X2 application protocol (X2AP) (Release 12)—Dec. 2013.

\* cited by examiner

METHOD IN A FIRST RADIO BASE STATION FOR HANDLING RE-ESTABLISHMENT OF A CONNECTION DUE TO RADIO LINK FAILURE

PRIORITY

This nonprovisional application is a U.S. National Stage Filing under 35 U.S.C. § 371 of International Patent Application Serial No. PCT/SE2014/051068 filed Sep. 16, 2014, and entitled "A Method In A First Radio Base Station For Handling Re-Establishment Of A Connection Due To Radio Link Failure" which claims priority to U.S. Provisional Patent Application No. 61/883,271 filed Sep. 27, 2013, both of which are hereby incorporated by reference in their entirety.

TECHNICAL FIELD

Embodiments herein relate to a first radio base station, an Operation and Maintenance (O&M) node and methods performed therein. In particular embodiments herein relate to handling communications in a radio communications network.

BACKGROUND

In a typical radio communications network, wireless devices, also known as mobile stations and/or User Equipments (UEs), communicate via a Radio Access Network (RAN) to one or more Core Networks (CN). The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the wireless devices within range of the base stations.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network (CN). E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g. eNodeBs in LTE, and the core network. As such, the Radio Access Network (RAN) of an EPS has an essentially "flat" architecture comprising radio base stations without reporting to RNCs. Radio base stations communicate directly with one another over X2 interfaces.

According to the latest discussions in 3GPP, a problem has been reported in R3-131285 "Impact on MRO from RRC reestablishment", Huawei, Fujitsu, CATT, RAN3 #81. A so-called ambiguity problem is that the UE reports the cell ID of the cell where a reestablishment of a connection, after a lost connection, will be attempted when the suitable cell is selected, and not when the reestablishment is completed, while the eNB will generate the Radio Link Failure (RLF) indication for each attempted reestablishment, independent if it is completed, succeeded or rejected, or incomplete. This leads to a problem of ambiguity in that not knowing whether the reestablishment cell is to be considered during a Mobility Robustness Optimization (MRO) process or not.

STATE OF THE ART

Two solutions have been proposed to this problem in R3-131285 "Impact on MRO from RRC reestablishment", Huawei, Fujitsu, CATT, RAN3 #81. Both solutions rely on providing additional information to the eNodeB receiving the RLF indication. One is UE based and the other is network based.

UE Based Solution

In this solution, an RLF report is modified according to any one out of:

Include an indicator in the RLF report to indicate whether the reestablishment was successful or rejected, or incomplete;

Only include reestablishment cell ID if the reestablishment was either successful or rejected;

Include the causes of the failed reestablishment in the RLF report, such as 'no suitable cell can be selected', 'the selected cell is no longer suitable', 'the RRC reestablishment request is rejected', etc, where RRC stands for Radio Resource Control.

Only send an RLF Report when the reestablishment was either successful or rejected.

Network Based Solution, or Radio Base Station Based Solution

The basic idea in this solution is to add a flag into the first RLF indication, which is triggered by the reestablishment. This information may be stored in the receiving eNodeB and combined with a second RLF indication, which may be triggered by the RLF report. This is possible since Release (Rel) 11 of the 3GPP standard, because the Cell-Radio Network Temporary Identifier (C-RNTI) is added to the RLF report. This enables the eNodeB receiving the two RLF indications to match the RLF indications from the same event.

At reestablishment, the eNodeB sending the RLF indication would include the outcome of the reestablishment.

The eNodeB receiving this RLF indication would store the C-RNTI, the time the RLF indication was received, and the reported outcome of the reestablishment When the eNodeB receives an RLF indication triggered by the reception of an RLF report, the eNodeB may use the reported C-RNTI and timer value, the time between failure and reporting, to retrieve the previously stored information.

The eNodeB may also include this information in a Hand Over (HO) report, if sent.

Although the UE based solution is quite straightforward, as highlighted in R3-131285 "Impact on MRO from RRC reestablishment", Huawei, Fujitsu, CATT, RAN3 #81 it would require that the UE behavior is modified. In addition to this, this would only solve the ambiguity for Release 12 wireless devices, and not legacy wireless devices. Namely, this solution would not work for pre-Release 11 wireless devices or for wireless devices that do not support the enhancements proposed.

The network based solution would be more complex for the eNodeB and would require some significant change in the X2 Application Protocol (X2AP) RLF Indication. It would require storing the C-RNTI, the time the RLF indication was received, and the reported outcome of the reestablishment for up to 48 hours, in order to possibly combine with a second RLF indication.

These solutions, to improve the performance of the radio communications network, thus may not affect legacy wireless devices and/or may involve a complex alteration in the eNodeB, which leads to a reduced performance of legacy wireless devices and/or complicated process of the eNodeB.

SUMMARY

An object of embodiments herein is to provide a mechanism that improves the performance of the radio communications network in an efficient manner.

According to an aspect the object is achieved by providing a method performed in a first radio base station for handling communication in a radio communications network. The first radio base station is comprised in the radio communications network. The first radio base station receives a report of an RLF of a wireless device, from the wireless device. The report comprises an identity of a first cell for re-establishing connection in. The first radio base station compares the identity of the first cell in the received report with a cell identity of a current cell the wireless device is currently connected to. In case the identities do not match, the first radio base station discards the report of an RLF, and increments a counter counting a number of times that the first cell was reported as a reestablishment cell and not being a current cell to which the wireless device is currently connected to. The first radio base station then reports a report of an event to an Operation and Maintenance, O&M, node, which report of an event comprises the number of the counter.

According to another aspect the object is achieved by providing a method performed in an O&M node for managing communication or handover parameters in a radio communications network. The radio communications network comprises a first radio base station and a second radio base station. The O&M node receives a report of a reestablishment event from the first radio base station, which report of a reestablishment event indicates a reestablishment procedure from a wireless device towards a cell of reestablishment. The O&M node further receives a report of an event from the first radio base station, which report of an event relates to a radio link failure of the wireless device and comprises a number of a counter counting a number of times that a first cell was reported as a cell for re-establishing connection in and not being a current cell to which the wireless device is currently connected to. The O&M node correlates the received report of an event with the received report of a reestablishment event into a result; and transmits the result in a second report of an event to the second radio base station associated with the radio link failure.

According to yet another aspect the object is achieved by providing a first radio base station for handling communication in a radio communications network. The first radio base station is configured to receive a report of an RLF of a wireless device, from the wireless device, which report comprises an identity of a first cell for re-establishing connection in. The first radio base station is further configured to compare the identity of the first cell in the received report with a cell identity of a current cell the wireless device is currently connected to; and in case the identities do not match, being configured to: discard the report of an RLF; increment a counter counting a number of times that the first cell was reported as a reestablishment cell and not being a current cell to which the wireless device is currently connected to; and to report a report of an event to an O&M node, which report of an event comprises the number of the counter.

According to still another aspect the object is achieved by providing an O&M node for managing communication or handover parameters in a radio communications network. The radio communications network comprises a first radio base station and a second radio base station. The O&M node being configured to receive a report of a reestablishment event from the first radio base station, which report of a reestablishment event indicates a reestablishment procedure from a wireless device towards a cell of reestablishment. The O&M node further being configured to receive a report of an event from the first radio base station, which report of an event relates to a radio link failure of the wireless device and comprises a number of a counter counting a number of times that a first cell was reported as a cell for re-establishing connection in and not being a current cell to which the wireless device is currently connected to. The O&M node is configured to correlate the received report of an event with the received report of a reestablishment event into a result; and to transmit the result in a second report of an event to the second radio base station associated with the radio link failure.

By counting the number of times that the first cell was reported as a reestablishment cell and not being a current cell to which the wireless device is currently connected to, embodiments provide an advantage to enable a correct decision on whether to run an MRO process, on certain reestablishment cells and eventually adjust mobility parameters towards such cells or whether simply ignore those reestablishment cells because they do not represent reliable candidate cells for reestablishment and therefore for mobility. This results in an improved performance of the radio communications network. Embodiments herein are network based, i.e. embodiments have no wireless device impact. Because of being network based embodiments herein may also work with legacy wireless devices, e.g. wireless devices not supporting RLF Reporting or not supporting some of the RLF Report enhancements agreed in latest releases.

BRIEF DESCRIPTION OF DRAWINGS

Embodiments will now be described in more detail in relation to the enclosed drawings, in which.

DETAILED DESCRIPTION

Figure 1:
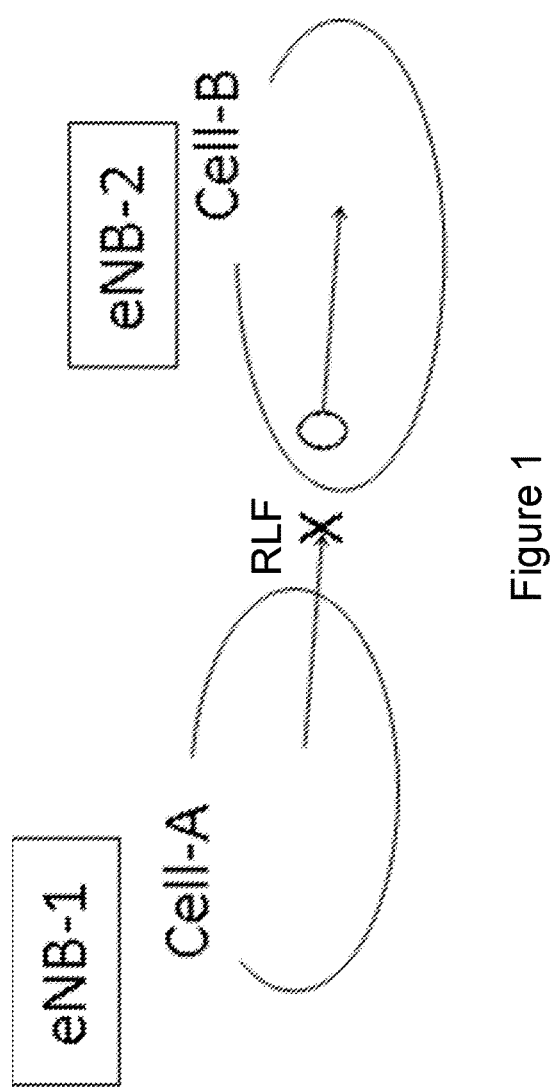
FIG. 1 shows a schematic overview depicting an RLF scenario.

As part of developing embodiments herein first a problem has been identified.

One of the goals of a consistent Mobility Robustness Optimization (MRO) solution is to make information about the failure reports available in the nodes where the failure has been originated, assuming these nodes are the ones responsible to perform the proper corrections e.g. adjust the hysteresis to avoid too late handovers. The corrections may be applied to the cell pairs associated to the node where the failure has occurred and to the cell where a successful reestablishment occurred.

According to E-UTRAN specifications TS 36.331, Evolved Universal Terrestrial Radio Access (E-UTRA); Radio Resource Control (RRC); Protocol Specification. V.11.0.0 section 5.3.7.4, an RLF identified at the wireless device side is followed by a cell selection and an attempted to perform RRC connection reestablishment. No matter what the result of the reestablishment is, i.e. successful or rejection, or failure, the ReestablishmentCellId in the VarRLF-report will be sent to the E-UTRAN selected cell. Hence, when the VarRLF-report reaches the radio base station where the failure has occurred, this radio base station cannot interpret this reestablishment properly since it could be any of the three cases.

According to TS 36.423, Evolved Universal Terrestrial Radio Access Network (E-UTRAN); X2 Application Protocol. V 11.0.0 section 8.3.9, an X2AP RLF indication can be triggered by a reestablishment attempt, i.e. when "a reestablishment request is received". In this case, it does not necessarily require that the reestablishment is successful or failed, or rejected. Similarly, the reception of the X2AP RLF indication may also be ambiguous so that the radio base station receiving the RLF indication does not know if that was a successful case.

This translates into a problem of not knowing whether the reestablishment cell shall be considered during the process of mobility robustness optimisation. Namely, it is not possible to judge whether the reestablishment cell was a real handover target towards which mobility parameters could be optimised, e.g. case of successful reestablishment or rejection at reestablishment base station, or if the reestablishment cell was e.g. an overshooting cell who's coverage was temporarily or erroneously stretching to the UE position and therefore that should not be considered as an handover candidate towards which mobility parameters should be optimised, e.g. case of reestablishment failure due to reestablishment cell not being available anymore. The latter problem is explained in more details in the next sections.

The Ambiguity Problem of the Identity of the Reestablishment Cell

According to discussions in 3GPP, a problem has been reported in R3-131285 "Impact on MRO from RRC reestablishment", Huawei, Fujitsu, CATT, RAN3 #81. The so-called ambiguity problem, that embodiments herein solve, is that the UE reports the cell ID of the cell where a reestablishment will be attempted when the suitable E-UTRA cell is selected, and not when the reestablishment is completed, while the radio base station will generate the RLF indication for each attempted reestablishment, independent if it is completed, succeeded or rejected, or incomplete.

In some cases, the reestablishment fails during the procedure due to radio problems and the UE will abort the procedure and return to RRC_IDLE state. This indicates that this reestablishment cell may not be suitable for mobility and may not be considered in the MRO analysis.

As described in R3-131285 "Impact on MRO from RRC reestablishment", Huawei, Fujitsu, CATT, RAN3 #81, in the HO too late case the reestablishment cell is typically used to validate that the failure is not caused by a coverage hole and also indicates to which cell a handover should have been triggered earlier. But if the reestablishment fails during the procedure due to radio problems, e.g. due to the cell not being suitable anymore at the time the reestablishment is triggered, it may not be beneficial to adjust the mobility parameters towards that reported reestablishment cell.

In the HO to wrong cell case, the cell selected for the failed handover is typically adjusted to make the handover occur later. But it is also possible to trigger future handovers to the reestablishment cell earlier. But if the reestablishment fails during the procedure due to radio problem it will not be beneficial to adjust the mobility parameters: for example, the reestablishment cell selected by the UE and included in the RLF report may be an overshoot cell only temporarily available in that area and the reestablishment failure may be due to such cell not being available anymore at the time of reestablishment request.

In the HO too early case, the reestablishment cell can be the same as the source cell in case of handover failure (HOF). In this case, the problem does not exist, since the analysis is performed in the same radio base station where the UE attempts to reestablish. But if the RLF occurs after staying a short time in the target cell after a successful handover, the reestablishment cell (source) will trigger an RLF indication to the target cell which may respond with a HO report back to the source cell. If the reestablishment fails during the procedure due to e.g. lack of resources at source base station, adjusting the handover to take place later will not help to resolve the situation, since the UE was not able to reestablish back to the last serving cell.

Figure 2:
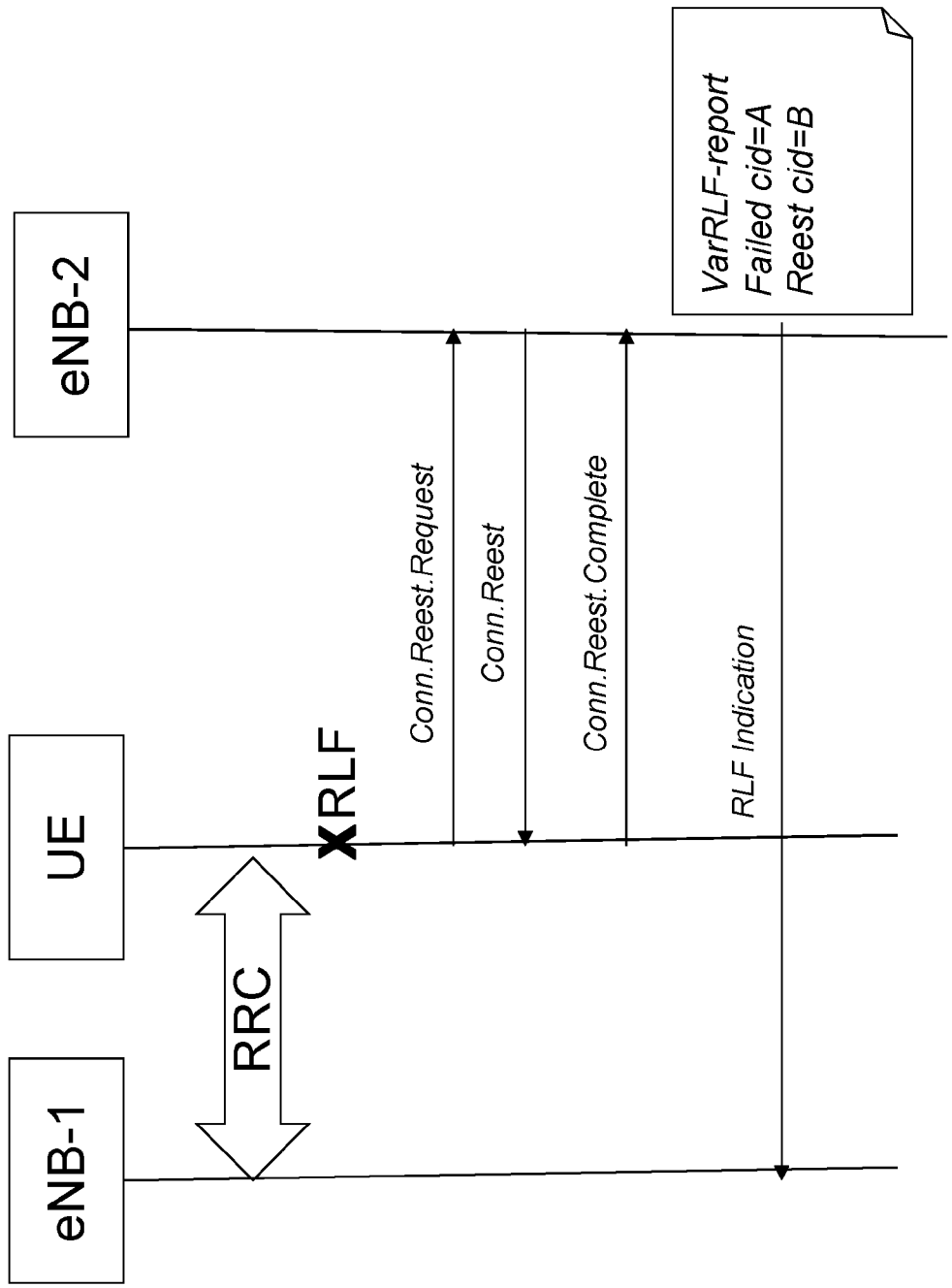
FIG. 2 shows a signalling scheme depicting a reestablishment scenario.

FIGS. 1-4 illustrate the ambiguity problem with an example. The case of an LTE network is considered in the example, but the methods described in this document are applicable to any radio access technology where mobility optimization is possible. In the scenario described by FIG. 1 an RLF, denoted as 'X' in FIG. 1, occurring in Cell-A of eNB-1 is followed by a successful reestablishment, denoted as 'O' in FIG. 1, in Cell-B of eNB-2. As shown in FIG. 2, an RRC communication between a UE and eNB-1 is interrupted by an RLF. The UE performs a reestablishment to a second eNB, eNB-2, by transmitting a ConnectionReestabilshmentRequest, receiving a ConnectionReestabilshment and transmitting a ConnectionReestabilshmentComplete. Then a VarRLF-report is generated with failed cell (Fail cid)=A and reestablishment cell (Reest cid)=B. This is transmitted back to the eNB-1 in an RLF indication.

Figure 3:
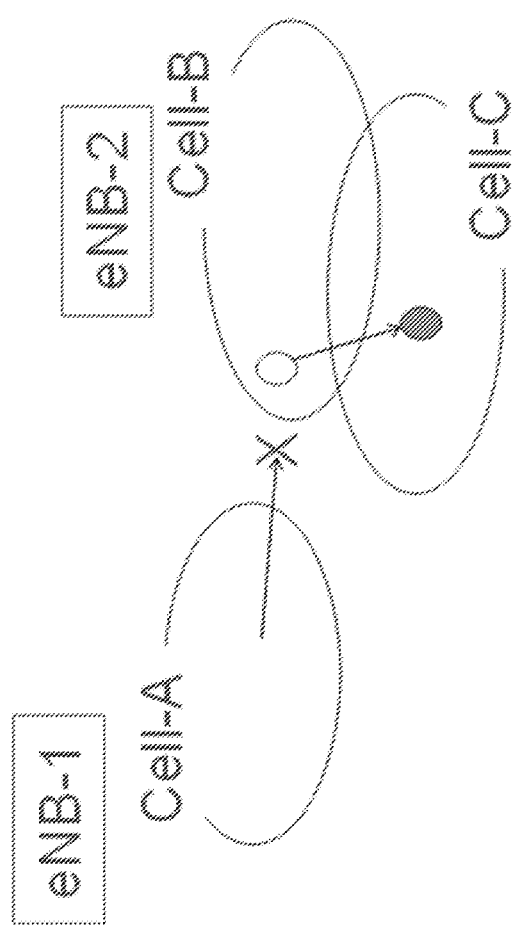
FIG. 3 shows a schematic overview depicting an RLF scenario.

Now consider the scenario described in FIG. 3, where an RLF in cell-A is followed by an initial reestablishment attempt to cell-B that fails or is rejected. After that the UE succeeds to reestablish the connection in cell-C. In this case it means that the first reestablishment report does not contain the RLF report, only the second reestablishment report.

Figure 4:
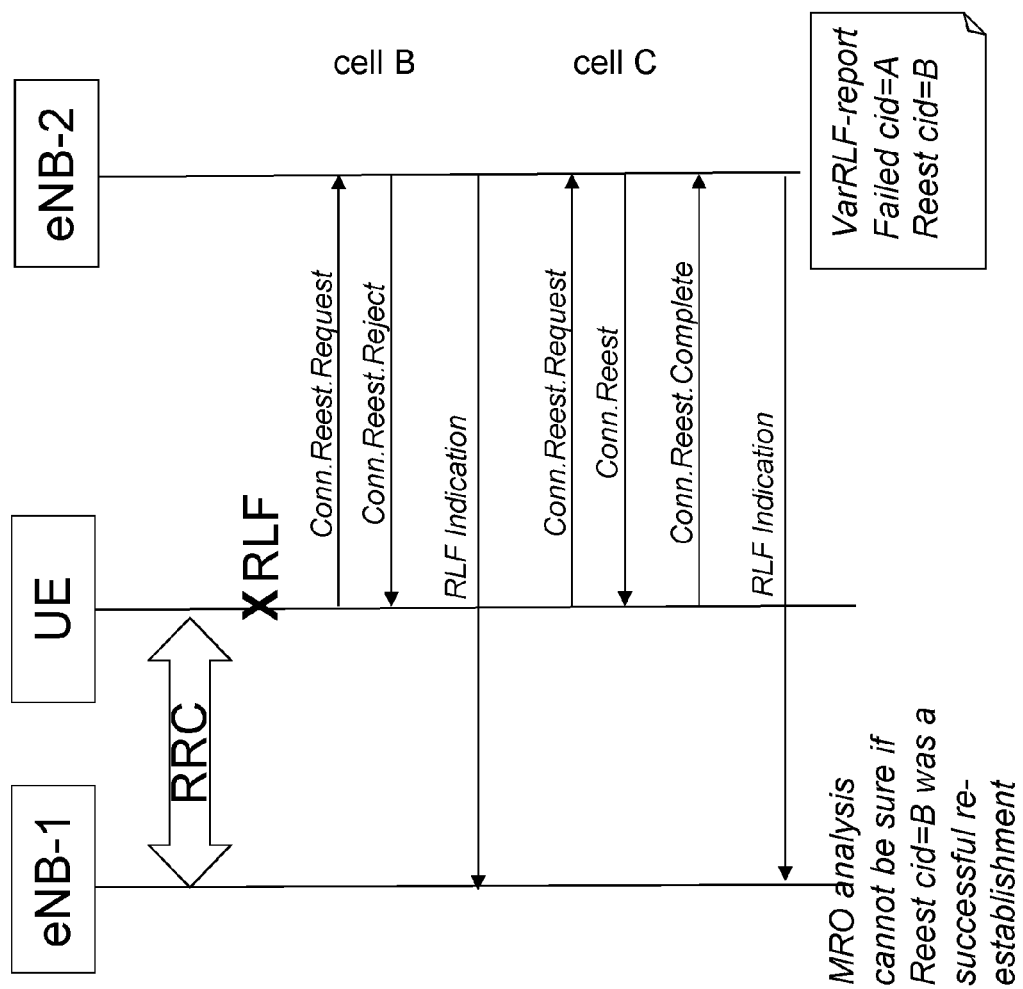
FIG. 4 shows a signalling scheme depicting a reestablishment scenario.

In this case, as shown in FIG. 4 where a problem solved by embodiments herein is shown, two RLF indication messages will be received by eNB-1. RRC communication between the UE and eNB-1 is interrupted by an RLF. The UE performs a reestablishment attempt to a cell B of the second eNB, eNB-2, by transmitting a ConnectionReestabilshmentRequest, but receives a ConnectionReestabilshmentReject. An RLF indication is transmitted to the eNB-1.

Then the UE performs a reestablishment attempt to a cell C of the second eNB, eNB-2, by transmitting a ConnectionReestabilshmentRequest, receiving a ConnectionReestabilshment and transmitting a ConnectionReestabilshmentComplete. Then a VarRLF-report is generated at the UE with failed cell (Fail cid)=A and reestablishment cell (Reest cid)=B. This is transmitted back to the eNB-1 in an RLF indication.

It can be seen from this example that in both cases, the eNB-1 receiving RLF indication with or without VarRLF-report cannot differentiate between these two scenarios, namely it becomes ambiguous at eNB-1 to understand towards which cell to perform mobility adjustments and how. Hence, MRO analysis cannot perform actions towards the proper reestablishment cell.

To aggravate the problem there is the case of UEs not supporting RLF Reporting, which translates in cases where the RLF INDICATION message does not contain the RLF Report, also referred to as VarRLF-report. In fact, the RLF Report contains useful information such as neighbor cell measurements, which could reveal if a reestablishment cell is a good candidate target from a radio point of view. Despite that these measurements cannot resolve the ambiguity coming from reception of multiple RLF INDICATION messages or coming from the fact that the reestablishment cell in RLF INDICATION is not the cell where reestablishment succeeded or was deliberately rejected by reestablishment base station, these measurements could help in taking a more educated decision on mobility robustness optimization. However, in case of UEs not supporting RLF Reports, this information is not available.

In summary, the current standards or any vendor implementation do not support the radio base station in deciding if a ReestablishmentCellId in the VarRLF-report is associated to i) a successful or rejection reestablishment, or ii) a failed case which would be crucial to an optimal MRO performance. Given this ambiguity, the radio base station cannot e.g. select the RLF reports to reject or to be considered in the MRO analysis. This is the ambiguity that embodiments herein solve.

In this section, the procedures involved in the ambiguity problem are presented in more details.

Generation of the RFL Report

Figure 5A:
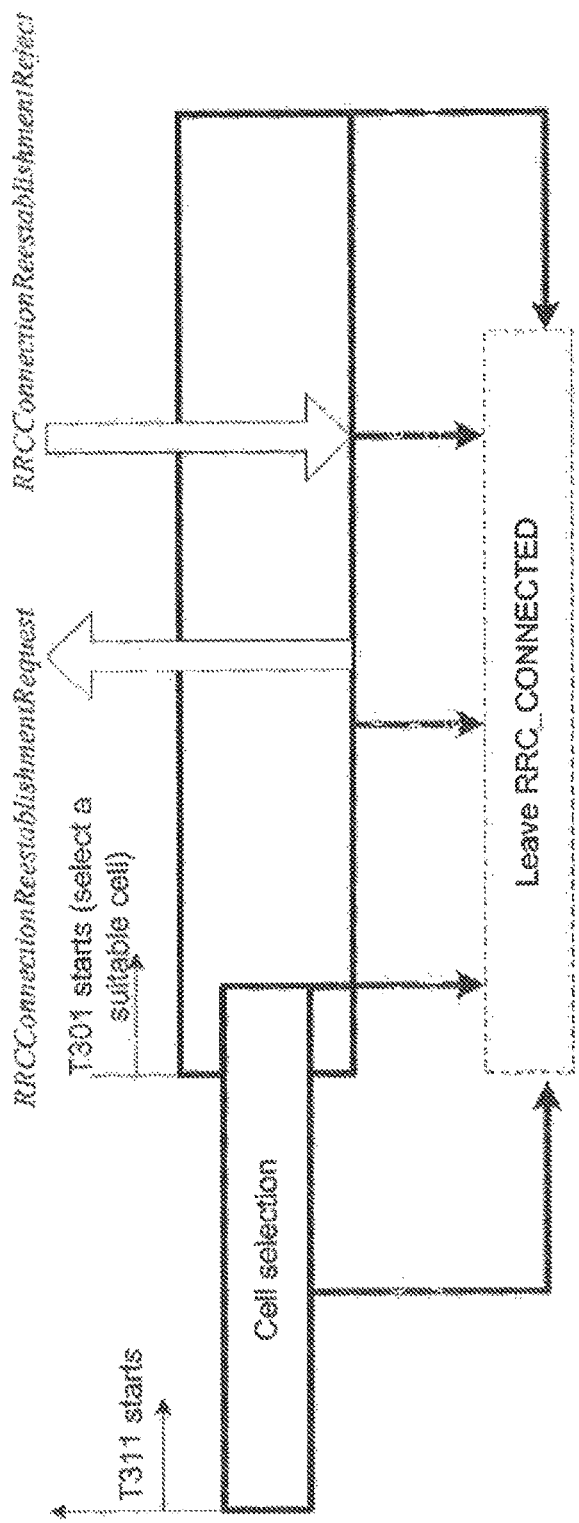
FIG. 5a shows timers running in a reestablishment scenario.

According to the sections 5.3.7.3 and 5.3.7.4 of TS 36.331 EVOLVED UNIVERSAL TERRESTRIAL RADIO ACCESS (E-UTRA); RADIO RESOURCE CONTROL (RRC); PROTOCOL SPECIFICATION. V.11.0.0, the ReestablishmentCellId is stored in the VarRFL-Report when the suitable E-UTRAN cell is selected. As shown in the FIG. 5a, a timer T301 runs between the transmission of the RRCConnectionReestabilshmentRequest until the reception of RRCConnectionReestablishment or the RRCConnectionReestablishmentReject message.

Figure 5C:
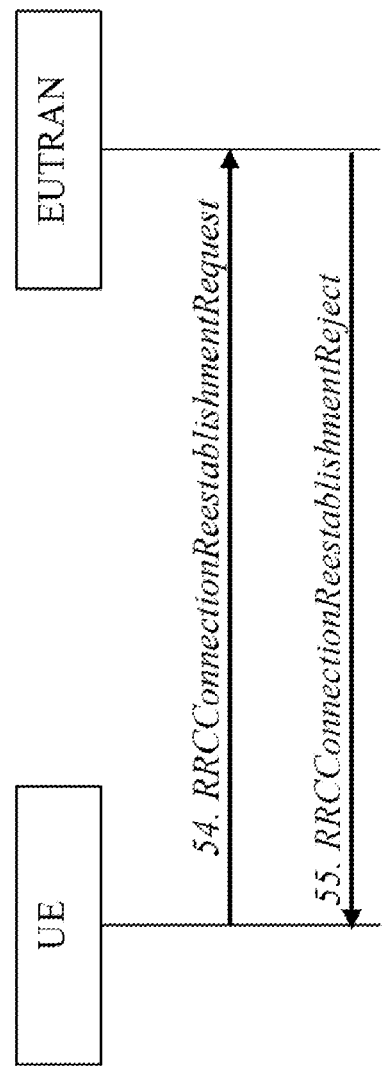
FIG. 5c shows signalling scheme of RRC connection re-establishment, failure
Figure 5B:
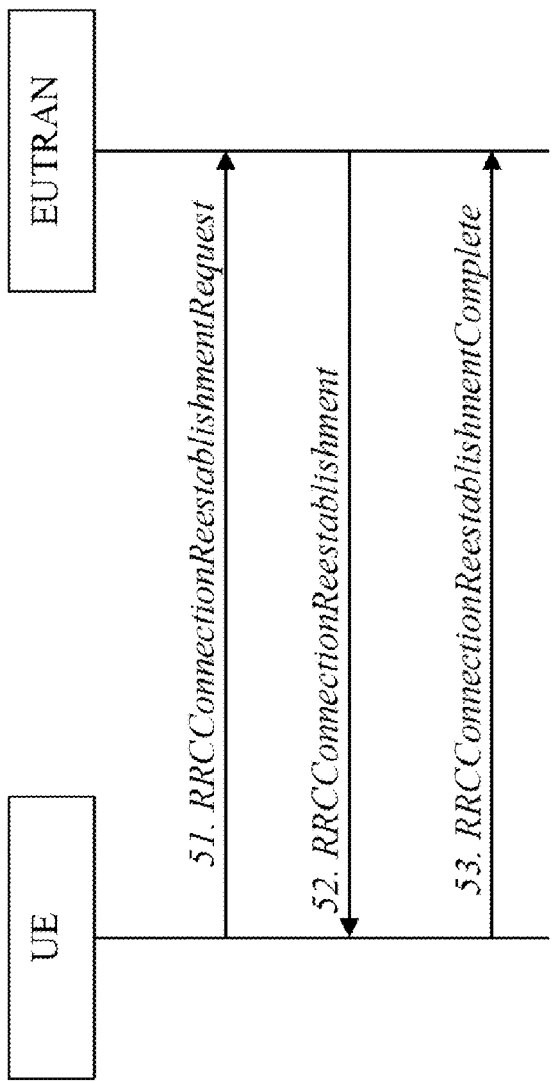
FIG. 5b shows signalling scheme of RRC connection re-establishment, successful

According to the specifications TS 36.331, Evolved Universal Terrestrial Radio Access (E-UTRA); Radio Resource Control (RRC); Protocol Specification. V.11.0.0, in section 5.3.7, three outcomes could occur of the RRC reestablishment from the UE point of view after transmission of RRCConnectionResstablishmentRequest message:

1. Successful RRC reestablishment notified at the UE by the reception of the RRCConnectionReestablishment. See FIG. 5b: Action 51. The UE transmits a RRCConnectionResstablishmentRequest message. Action 52. Reception of RRCConnectionReestablishment. Action 53. UE transmit RRCConnectionReestablishmentComplete message 2. Reception of RRCConnectionReestablishmentReject indicating the requested radio base station does not accept the connection. See FIG. 5c: Action 54. The UE transmits a RRCConnectionResstablishmentRequest message. Action 55. The reception of RRCConnectionReestablishmentReject.

3. Failure case where the timer T301 expires during cell selection or the selected cell is no longer available; In this case the UE leaves RRC_CONNECTED state.

Make the Failure Information Available at the E-UTRAN

The RLF report is stored in the UE up to 48 hours. As indicated in sections 5.3.7.5, 5.4.2.3 and 5.3.3.4 of TS 36.331, Evolved Universal Terrestrial Radio Access (E-UTRA); Radio Resource Control (RRC); Protocol Specification. V.11.0.0, the UE will notify the E-UTRAN that a stored RLF report is available by using the rlf-InfoAvailable in either:

The RRCConnectionReestablishmentComplete message, or

The RRCConnectionReconfigurationComplete message, or

The RRCConnectionSetupComplete message.

The radio base station may then request the information stored in RLF report using UEInformationRequest message, as specified in section 5.6.5.3 of TS 36.331 v.11.0.0. After the message is received by the radio base station, the UE will discard the VarRLF-Report.

Reporting the VarRLF-Report to the Right Radio Base Station Via X2AP RFL Indication RLF Indication procedure is defined in TS 36.300 EVOLVED UNIVERSAL TERRESTRIAL RADIO ACCESS (E-UTRA) AND EVOLVED UNIVERSAL TERRESTRIAL RADIO ACCESS NETWORK (E-UTRAN); OVERALL DESCRIPTION; STAGE 2, V.11.0.0 as follows:

"The purpose of the Radio Link Failure Indication procedure is to enable mobility robustness improvement in E-UTRAN by passing information about a failure event over the X2 interface. When a reestablishment request is received or a connection failure reported after RRC connection setup, the eNB uses the cell identifiers provided by the UE to identify the potentially previous serving cell/eNB. The eNB that received the information about the failure sends an RLF INDICATION message to the concerned eNB(s). The previously serving eNB may then match the correct context, or use the information available in the RLF Report, if included in the RLF INDICATION message, to analyze the possible root cause of the failure."

According to the underlined part of the text above, the RLF Indication can be triggered following a reestablishment attempt, i.e. when "a reestablishment request is received". In this case it does not necessarily require that the reestablishment is successful or failed, or rejected.

One example as described previously, would be the case where after transmission of RRCConnectionReestablishmentRequest message by the UE, the timer T301 expires or selected cell is no longer suitable, then the UE will return to RRC_IDLE. If this happens after the RRCConnectionReestablishmentRequest is received by the radio base station, this will be perceived as an incomplete reestablishment.

Thus, there are three outcomes of the RRC reestablishment from the radio base station's point of view:
  Reception of the RRCConnectionReestablishmentComplete
  Successful transmission of RRCConnectionReestablishmentReject
  Incomplete, i.e. the RRCConnectionReestablishmentRequest is received by the radio base station, but the UE returns to idle mode.

Note that a further outcome could be that the UE sends the RRCConnectionReestablishmentRequest but this message is never received by the eNB. In this case the reestablishment cell will be stored in the VarRFL-Report, although reestablishment to that cell did not even result in successfully send the RRCConnectionReestablishmentRequest message.

As the RLF indication may be triggered both by receiving a reestablishment request or when a connection failure is reported, when receiving a VarRLF-report, this may result in that one failure triggers the transmission of two RLF indications Also, in cases of reestablishment failing due to unsuccessful reception of the RRCConnectionReestablishmentRequest at the eNB, the problem would be that of unreliable reestablishment cell in the RLF Report uploaded by the UE at next successful RRC connection.

As stated above, two solutions have been proposed to this problem in R3-131285 "Impact on MRO from RRC reestablishment", Huawei, Fujitsu, CATT, RAN3 #81. Both solutions rely on providing additional information to the radio base station receiving the RLF indication. One is UE based and the other is network based.

UE Based Solution
In this solution, the RLF report is modified to either:
  Include an indicator in the RLF report to indicate whether the reestablishment was successful or rejected, or incomplete;
  Only include reestablishment cell ID if the reestablishment was either successful or rejected;
  Include the causes of the failed reestablishment in the RLF report, such as no suitable cell can be selected, the selected cell is no longer suitable, the RRC reestablishment request is rejected, etc.
  Only send RLF Report when the reestablishment was either successful or rejected.

Network Based Solution
The basic idea in this solution is to add a flag into the first RLF indication, triggered by the reestablishment. This information, the flag, can be stored in the receiving radio base station and combined with a second RLF indication, triggered by the RLF report. This is possible since Rel11, because the C-RNTI is added to the RLF report. This enables the radio base station receiving the two RLF indications to match the RLF indications from the same event.

At reestablishment, the radio base station sending the RLF indication would include the outcome of the reestablishment.

The radio base station, eNB-1, receiving this RLF indication would store
  the C-RNTI,
  the time the RLF indication was received,
  and the reported outcome of the reestablishment
  When the radio base station, eNB-1, receives an RLF indication triggered by the reception of an RLF report, the radio base station, eNB-1, can use the reported C-RNTI and timer value, the time between failure and reporting, to retrieve the previously stored information.
  The radio base station, eNB-1, may also include this information in the HO report (if sent)
Problems with these Solutions:
  Although the UE based solution is quite straightforward, as highlighted in R3-131285 "Impact on MRO from RRC reestablishment", Huawei, Fujitsu, CATT, RAN3 #81 it would require that the UE behavior is modified. In addition to this, this would only solve the ambiguity for Rel12 UEs, and not legacy UEs. Namely, this solution would not work for pre-Release 11 UEs or for UEs that do not support the enhancements proposed.

The network based solution would be more complex for the radio base station and would require some significant change in the X2AP RLF Indication. It would require storing the C-RNTI, the time the RLF indication was received and the reported outcome of the reestablishment for up to 48 hours, in order to possibly combine with a second RLF indication.

According to embodiments described herein different embodiments solving the problem are provided. The way embodiments herein propose to solve this problem may be developed in at least two ways: first it may be developed on Performance Management solution at O&M level and secondly it may be developed according to standardization enhancements to O&M procedures.

Figure 6:
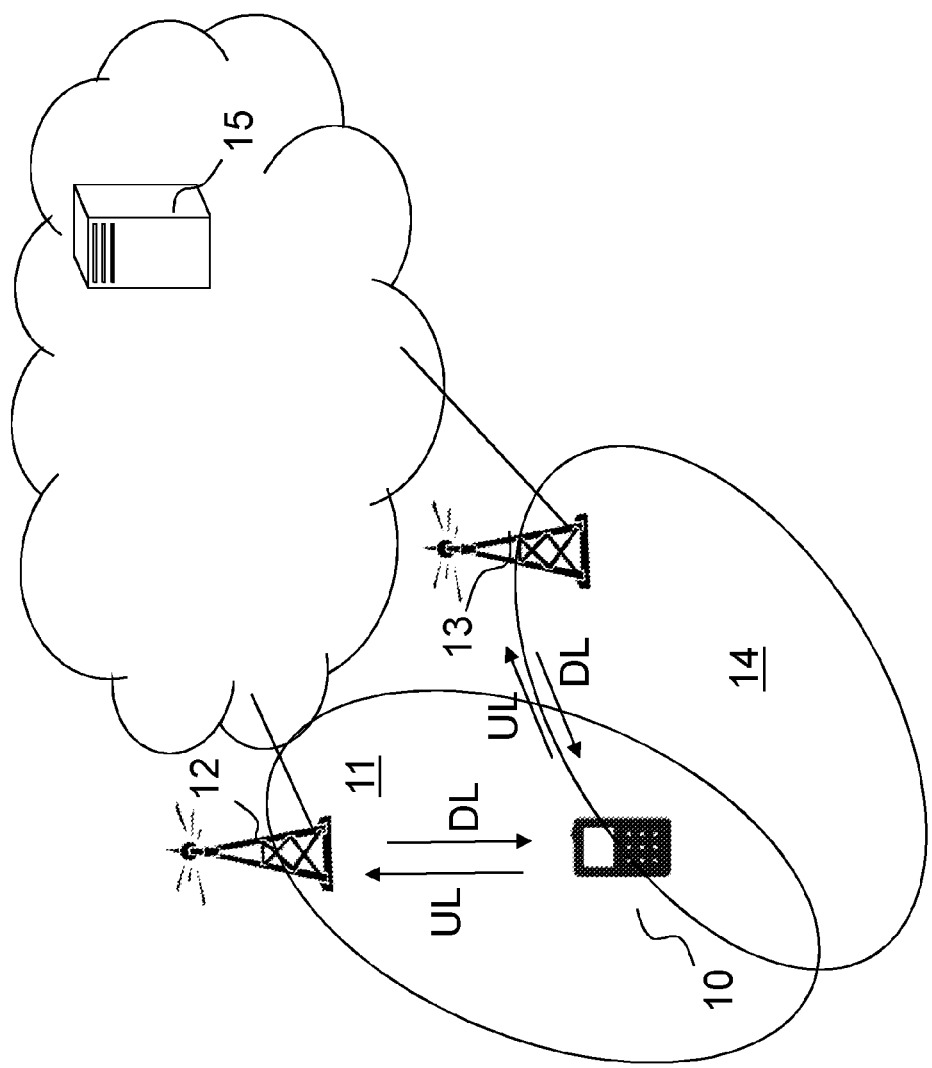
FIG. 6 is a schematic overview depicting a radio communications network according to embodiments herein.

FIG. 6 is a schematic overview depicting a radio communications network 1, also known as wireless communication network. The radio communications network 1 comprises one or more RANs and one or more CNs. The radio communications network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network 1 is exemplified herein as an LTE network.

A wireless device 10 operates in the radio communications network 1. The wireless device 10 is also known as a mobile station, a user equipment (UE) and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

The radio communications network 1 covers a geographical area which is divided into cell areas, e.g. a cell 11 being served by a first radio base station 12. The first radio base station 12 may also be referred to as a eNB-1 and may be e.g. a NodeB, an evolved Node B (eNB, eNode B), a base transceiver station, Access Point Base Station, base station router, or any other network unit capable of communicating with a wireless device within the cell served by the radio base station depending e.g. on the radio access technology and terminology used. The first radio base station 12 may serve one or more cells, such as the cell 11.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 is also broadcasted in the cell 11. The first radio base station 12 communicates over the air or radio interface operating on radio frequencies with the wireless device 10 within range of the first radio base station 12. The wireless device 10 transmits data over the radio interface to the first radio base station 12 in Uplink (UL) transmissions and the first radio base station 12 transmits data over an air or radio interface to the wireless device 10 in Downlink (DL) transmissions.

The first radio base station 12 may also communicate with a second radio base station 13, which may also be referred to as a eNB-2 and may be e.g. a NodeB, an evolved Node B (eNB, eNode B), a base transceiver station, Access Point Base Station, base station router, or any other network unit capable of communicating with a wireless device within the cell served by the radio base station depending e.g. on the radio access technology and terminology used. The second radio base station may serve one or more cells such as second cell 14.

Furthermore, in radio communications networks of today there is an operation support system node (OSS) or Operation and Maintenance (O&M) node. Hence, the radio communications network 1 comprises an O&M node 15, or OSS node, serving the wireless device 10. The O&M node 15 may be described as a network management system node supporting a specific management function, such as fault, performance, security, configuration etc. The O&M node 15 is used for managing communication, radio network dimensioning and/or similar.

Note: In the description, a single radio access technology has been considered, in an intra-frequency scenario. However, the embodiments herein can apply to any radio access technology with similar constraints and supporting similar solutions. Embodiments herein also apply to an inter-frequency or inter-RAT scenario.

In embodiments herein the wireless device 10 performs a reestablishment procedure as explained below.

Figure 7:
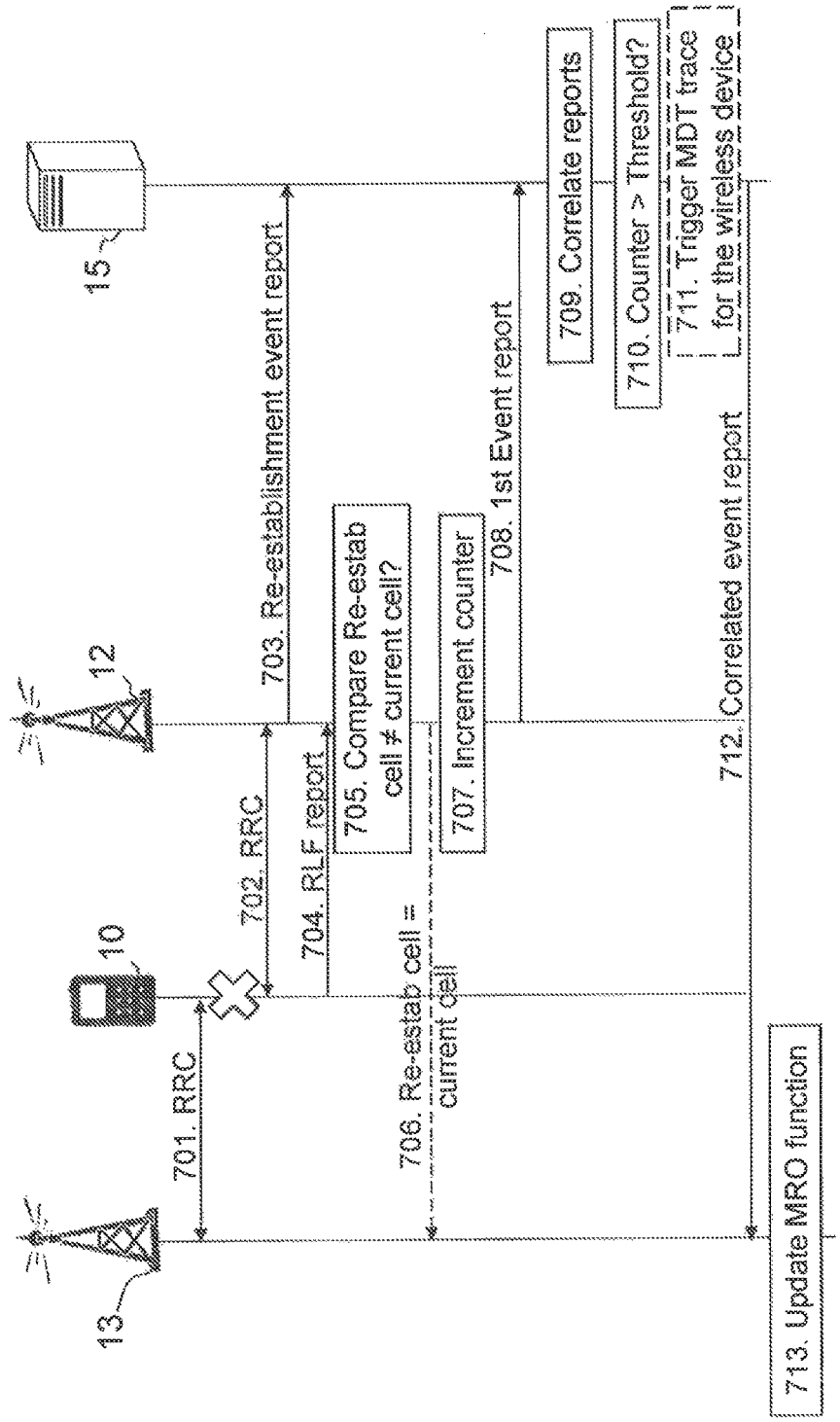
FIG. 7 is a combined flow chart and signalling scheme according to embodiments herein.

FIG. 7 is a combined flowchart and signalling scheme depicting embodiments herein.

Action 701. The wireless device 10 is communicating being RRC connected to the second radio base station 13. An RLF occurs disconnecting the wireless device 10 from the second radio base station 13 and the second cell 14.

Action 702. In order to get connected the wireless device 10 performs a reestablishment procedure to the first cell 11 of the first radio base station 12 setting up a RRC connection to the first radio base station 12.

Action 703. The first radio base station 12 transmits a reestablishment event report to the O&M node 15. The reestablishment event report comprises cell identity (cellID) of the first cell 11. This is done to report the cell of re-establishment.

Action 704. The wireless device 10 generates and transmits an RLF report in which the failed cell, the second cell 14, is identified and also the cell for re-establishing connection in, the first cell 11, is identified. The cell for re-establishing connection in is also herein called the reestablishment cell.

Action 705. The first radio base station 12 compares identity of the cell for re-establishing connection in the RLF report with an identity of a cell the wireless device 10 is currently connected to, that is the cell served by the first radio base station 12.

Action 706. In case the identity of the cell 11 in the received report matches the cell identity of the current cell the wireless device 10 is currently connected to, the first radio base station 12 may transmit the received RLF report to the second radio base station 13. The RLF report may additionally or alternatively be transmitted to the O&M node 15.

Action 707. In case the identities do not match, the first radio base station 12 discards the report of the RLF and increments a counter counting the number of times that the cell was reported as a reestablishment cell and not being a current cell to which the wireless device 10 is currently connected to. The mismatch is an indication that the reported cell is not the cell that the wireless device 10 ends up connected in.

Action 708. The first radio base station 12 then reports or sends a report of an event, also called first event report or DISCARDED_RLF_REPORT_EVENT, to the O&M node 15. The report of an event comprises the number of the counter and may be sent after a certain time interval or when a number threshold of the counter is exceeded. The O&M node 15 may also e.g. fetch or download the number of the counter from the first radio base station 12 e.g. via File Transfer Protocol (FTP).

Action 709. The O&M node 15 correlates the received report of an event with the received reestablishment event report into a result.

Action 710. The O&M node 15 monitors number of instances of discarded reports per cell in the received report of an event taking the number of the counter into account and compares the number of instances with a threshold. This may be done to indicate that the cell is not a handover candidate.

Action 711. The O&M node 15 may optionally trigger a MDT trace for the wireless device 10 once a high number of rejected or probably failed events are recorded per the first cell in order to enhance the information in a second event report to the second radio base station 13.

Action 712. The O&M node 15 may e.g. when the number of instances exceeds the threshold transmit the second report of an event to the second radio base station 13 where the radio link failure has been originated. The second report may be referred to as the second event report, correlated event report, or ENHANCED_RLF_REPORT_CORR_EVENT.

Action 713. The second radio base station 13 may correct an MRO function at the second radio base station 13 according to the received second report. E.g. if the counter exceeds the threshold, the first cell 11 may be indicated as a non candidate for a handover.

An Example of a Method 1 at the Radio Base Station Receiving the RLF Report, e.g. the First Radio Base Station 12, Corresponding the Actions 705-708.

Some embodiments herein provide a method running on the first radio base station 12 (eNB-1). The method comprises receiving RLF reports from the wireless device 10 comprising the identity of the reestablishment cell (X), comparing the identity of the reestablishment cell in the received RLF report with the cell identity of the current cell the wireless device 10 is connected to (C) and performing actions depending on the outcome of the comparison. For example, if the reestablishment cell X is different from the cell where the wireless device 10 is currently connected, i.e. cell C, second reestablishment cell or cell where the wireless device 10 reconnected from Idle, then exclude cell X from the MRO analysis as most likely it is not a mobility target candidate.

The method may also comprise the first radio base station 12 sending a received RLF report to a second radio base station 13 (eNB-2), for example via RLF INDICATION message, in the case of a positive result out of the matching between X and C. The positive matching is an indication that the reestablishment in the VarRLF-report is a successful one. In this case, the second radio base station 13 is certain about that when it receives the RLF report.

The method may also comprise the first radio base station 12 performing a different action in case the reestablishment cell identity in the VarRLF-report and the current cell the wireless device 10 is connected do not match i.e. when C is not equals to X. It is worth to remind that the non-match of cell identities represents a risk that the wireless device 10 had a failed or rejected attempt to reestablish the connection before.

In some embodiments the first radio base station 12 may discard, for the purpose of MRO analysis, the received VarRLF-report when the reestablishmentCellId in the VarRLF-report does not match the current cell the wireless device 10 is connected to. The report may not be discarded in the case where before the scenario described, the wireless device 10 first tried to connect to another cell, e.g. cell Y, in the first radio base station 12 earlier, right before, but was rejected. The report may not be discarded in the case where before the scenario described, the wireless device 10 connected successfully to another cell, e.g. cell Y, in the first radio base station 12 but an RLF-report was not requested. This action avoids the second radio base station 13 to receive an ambiguous RLF report that could be misinterpreted by MRO analysis at the second radio base station 13.

According to embodiments herein the first radio base station 12 defines a counter e.g. named pmNoUnmatchReestCells that counts the number of instances of discarded RLF reports per reestablishment cell. Namely, the counter counts the number of times that a cell was reported as reestablishment cell, but the wireless device 10 is connected to a different cell at the time of RLF Report uploading by the wireless device 10. This counter field may help identify whether, given a certain source cell, a reestablishment cell is a real handover candidate or not. This contributes to understand a best MRO action to optimise mobility parameters. As a typical Performance Monitoring (PM) counter, the values may be periodically reported to an O&M system, e.g. the O&M node 15, in a batch file or streaming mode.

In some embodiments the first radio base station 12 creates a PM event called DISCARDED_RLF_REPORT_EVENT with the following information: i) time stamp, ii) reestablishment cell identity at the RLF report, iii) cell identity where the report was received, iii) user identity. This event is triggered every time an RLF Report is received and the receiving first radio base station 12 decides to discard the report. Note that current specifications do not specify such PM event and this could be an implementation specific solution. The PM event may be sent to the O&M system periodically in a batch file or streaming mode. Time stamp may indicate time generated.

Figure 8:
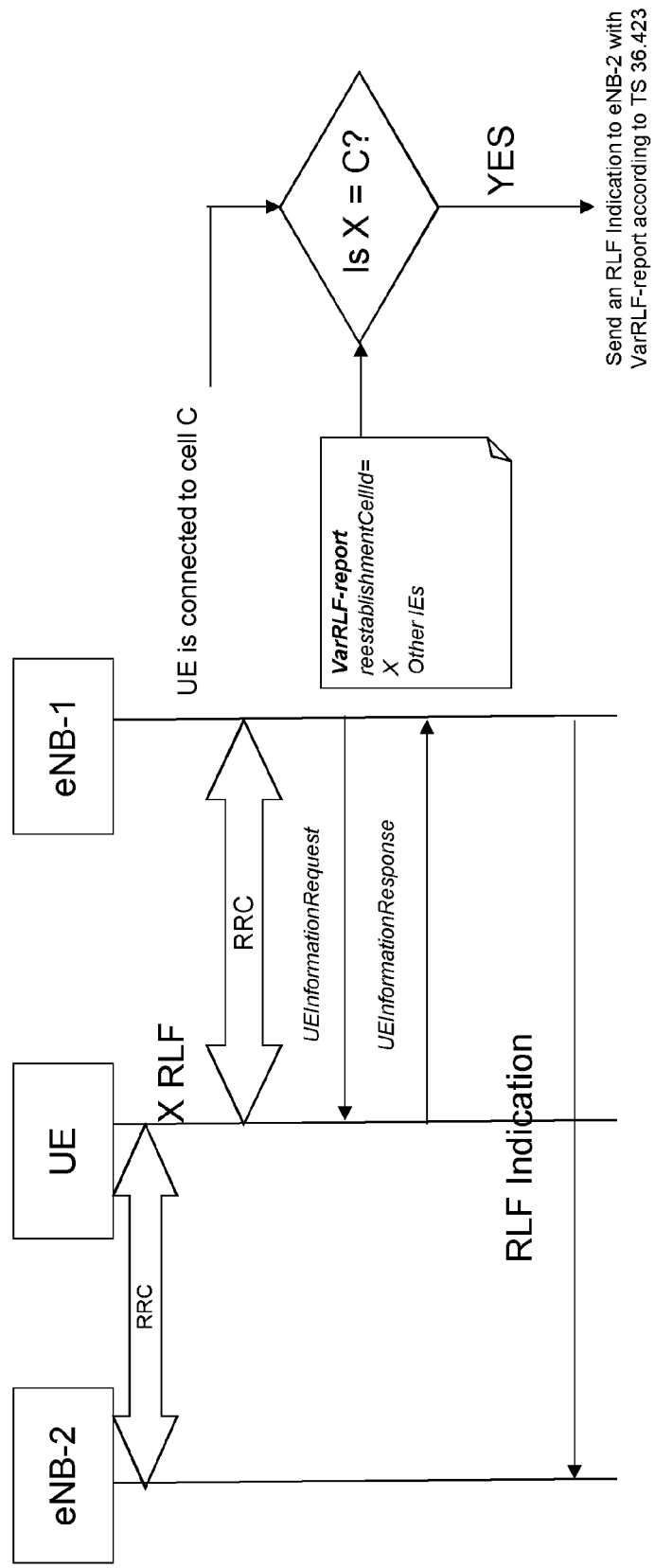
FIG. 8 is a schematic flow chart of a method in a first radio base station.
Figure 9:
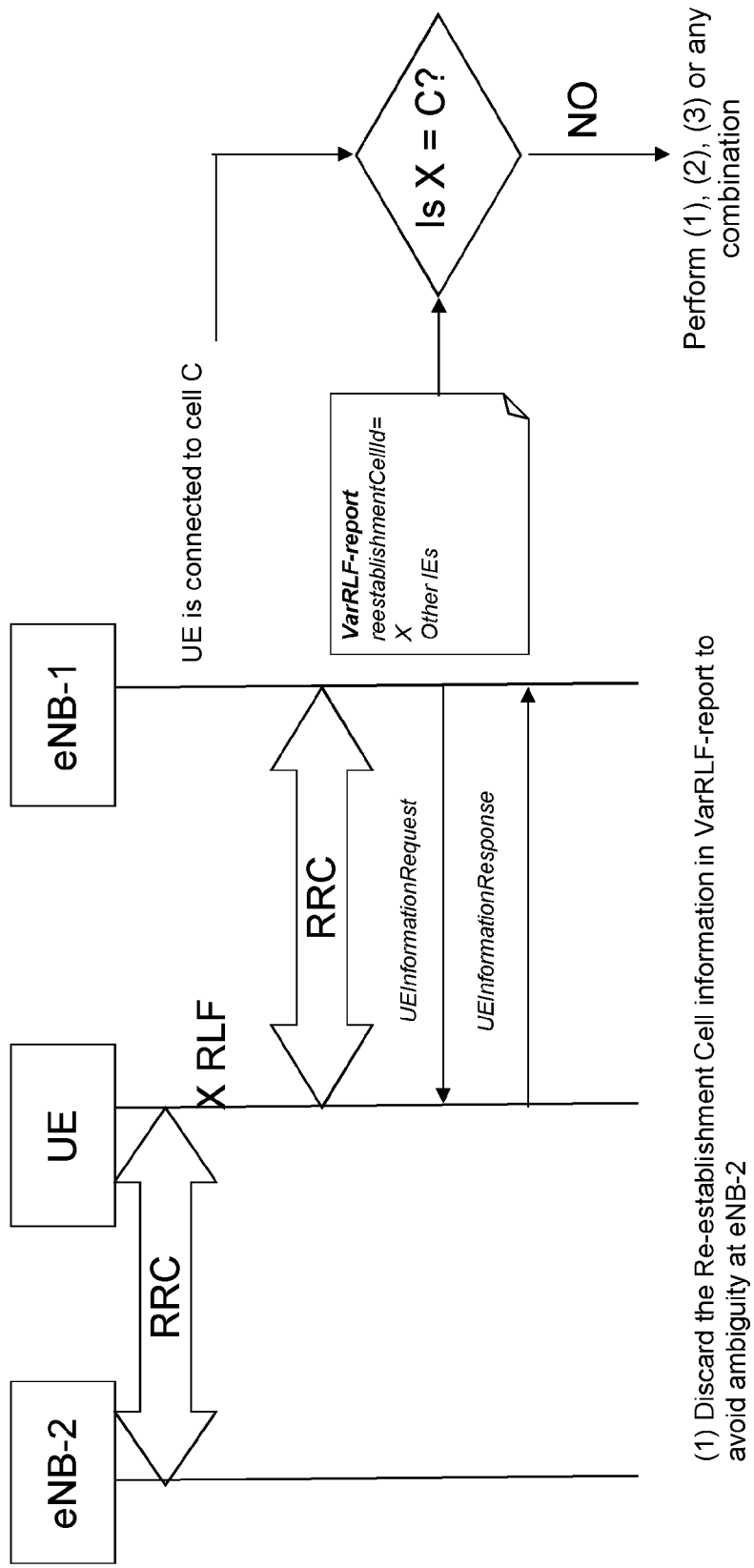
FIG. 9 is a schematic flow chart of a method in a first radio base station.

In FIG. 8 and FIG. 9 flowcharts for method 1 are shown.

In the following, an example of how a new internal event called INTERNAL_DISCARDED_RLF_REPORT_EVENT is detailed described with their respective attributes according to the notation in CPI FOR RADIO ACCESS NETWORK PRODUCTS, L13B, OPERATION AND MAINTENANCE. These event reports are generated at an eNB, such as the first radio base station 12, where the RLF report is received.

| pmEventName | Event Type | Event Description and Trigger | Interface classification | O&M protocol definition |
|---|---|---|---|---|
| DISCARDED_RLF_REPORT_EVENT | UE | Contains information on RLF reports discarded by an eNB when the reestablishment cell id is not the same as the cell where the UE reported the VarRLF-report | Uu | INTERNAL |

| Event Parameter Name | Parameter Description |
| --- | --- |
| EVENT_PARAM_TIME_STAMP | Time stamp in UNIX notation |
| EVENT_PARAM_REEST_LATEST_CID | Cell Identity of the cell where the UE is connected when the RLF report is send to E-UTRAN. |
| EVENT_PARAM_REEST_CID_IN_RLF_REPORT | Reestablishment Cell identity as it was in the discarded Reestablishment Cell IE of the RLF report i.e. the first attempt the UE had to reestablish the connection. |
| EVENT_PARAM_IMSI | UE unique identity |

An Example of a Method 2 at the Radio Base Station, e.g. the First Radio Base Station 12, where RRC Reestablishment Occur. This Corresponds to Action 703 Above.

Some embodiments herein provide a method running at the first radio base station 12 where RRC reestablishment occur the method comprising recording a PM event called RRC_REESTABLISHMENT_EVENT associated to the RRC reestablishment procedure and reporting to the O&M node 15 via batch files or streaming mode. These PM events are triggered by the reception of one the messages RRConnectionReestablishmentRequest, RRConnectionReestablishmentComplete, RRConnectionReestablishmentReject. The PM event may comprise the following information: i) time stamp, ii) cell identity of the reestablishment attempt, iii) result of the reestablishment which could be "successful", "rejected".

An Example of a Method 3 at the O&M System, e.g. the O&M Node 15, Enhancing the RLF Report Information. This Corresponds to Action 709 Above.

Some embodiments herein provides a third method the method comprising the O&M system such as the O&M node 15 receiving from first radio base station 12 the events RRC_REESTABLISHMENT_EVENT and DISCARDED_RLF_REPORT_EVENT, correlating these events by time and user identity, creating a new event or second event report called ENHANCED_RLF_REPORT_CORR_EVENT which contains the following information: i) time of failure, ii) cell where the failure occurred, iii) ordered list of cell identities where reestablishment attempts occurred after failure in failure cell and before successful reconnection, iv) list of results for these reestablishments (e.g. successful, rejected). An example of this information is provided in Table 1 below:

TABLE 1

Example of mapping between Failure cell and other relevant failure paramters.

| | | | |
| --- | --- | --- | --- |
| Failure Cell 1 | Time of Failure | Reestablishment Cell A | Reestablishment result Cell A |
| | | Reestablishment Cell B | Reestablishment result Cell B |
| Failure Cell 2 | Time of Failure | Reestablishment Cell A | Reestablishment result Cell A |
| | | Reestablishment Cell D | Reestablishment result Cell D |
| . | | | |
| . | | | |
| . | | | |
| Failure Cell n | Time of Failure | Reestablishment Cell C | Reestablishment result Cell D |
| | | Reestablishment Cell E | Reestablishment result Cell E |

The information in the table 1 above is useful to understand the target cell per source failure cell that are good handover candidates. For example, those cells for which reestablishment was successful or rejected, i.e. the wireless device 10 was able to successfully exchange RRC Reestablishment signalling with the reestablishment radio base station.

The information may also be useful for Coverage and Capacity Optimization (CCO) function at the O&M or NMS.

In addition to the reestablishment results "successful" and "rejected" a new result may be defined as "probably failed". This one is added when there is no reestablishment cell identity in the DISCARDED_RLF_REPORT_EVENT associated to a RRC_REESTABLISHMENT_EVENT. The wireless device 10 probably has chosen a cell and the cell was not available anymore when the wireless device 10 tried to send the RRC Reestablishment Request. This information is useful to understand that the reestablishment cell may not be a good candidate for mobility optimisation when the failure cell is source An Example of a Method 4 at the O&M Node 15. This Corresponds to Actions 710-712 Above.

Some embodiments herein provide a method running at the O&M system such as the O&M node 15 the method comprising the monitoring of the counter, reported from the first radio base station 12, e.g. pmNoUnmatchReestCells that counts the number of instances of discarded RLF reports per reestablishment cell and triggering further actions when the value of the counter becomes higher than a configured threshold.

In some embodiments, the O&M node 15 transmits to the radio base station where the RLF has been originated, e.g. the second radio base station 13, the event ENHANCED_RLF_REPORT_CORR_EVENT. Based on that, the MRO function at the second radio base station 13 is able to know the reestablishment attempts the wireless device 10 had, and to which cells, the result of these attempts, such as successful, rejected or probably failed, and perform the corrections accordingly.

In some embodiments, once a high number of rejected or probably failed events are recorded per failure cell, the O&M node 15 triggers MDT traces for wireless devices served by the second radio base station 13 hosting the failure cell in order to enhance the information in the ENHANCED_RLF_REPORT_CORR_EVENT-event to be reported to the radio base stations where the failures occur. Namely, the traces may be aimed at understanding if the reestablishment cells where reestablishment failed are feasible handover targets or not.

Note about Standard and Proprietary Implementation

In the embodiment of method 1, the first radio base station 12 creates a first event report being a performance monitoring (PM) event e.g. called DISCARDED_RLF_REPORT_EVENT and also in the method 4. It comprises a counter-based solution where a new counter is standardized followed by the triggering of specific MDT measurements. The proprietary implementation solution is event-based.

In the following, the specification of the correlated event ENHANCED_RLF_REPORT_CORR_EVENT is provided, which is generated at the O&M node 15 by correlating the events DISCARDED_RLF_REPORT_EVENT and RRC_CONNECTION_REESTABLISHMENT using the parameters EVENT_PARAM_IMSI and EVENT_PARAM_TIME_STAMP as keys for both events. The result is described as follows:

| pmEventName | Event Type | Event Description and Trigger | Interface classification | O&M protocol definition |
|---|---|---|---|---|
| ENHANCED_RLF_REPORT_CORR_EVENT | UE | Contains information about the VarRLF-report for which the Reestablishment Cell IE has been discarded but also information about the reestablishment attempts and the results of these attempts from the time the RLF occurred until the time the VarRLF-report is send to E-UTRAN | | CORRELATED |

| Event Parameter Name | Parameter Description |
|---|---|
| EVENT_PARAM_TIME_STAMP | Time when the first reestablishment attempt is notified |
| EVENT_PARAM_CID_RLF_OCCURED | Cell Identity of the cell where the RLF occurred, according to the RLF report |
| EVENT_PARAM_ARRAY_REEST_CID_ATTEMPTED | Ordered list of cell identities where reestablishment attempts occurred before success |
| EVENT_PARAM_ARRAY_TIME_REEST_ATTEMPTED | Time stamps the reestablishment attempts occurred |
| EVENT_PARAM_ARRAY_RESULTS_REEST_ATTEMPTED | Ordered list of reestablishment results |

One example of how the EVENT_PARAM_ARRAY_RESULTS_REEST_ATTEMPTED parameter could be is shown in Table 1 above, where a list of reestablishment cells per failure cell is shown. The specification of PM counters for E-UTRAN can be found in TS 36.425, PERFORMANCE MANAGEMENT (PM); PERFORMANCE MEASUREMENTS EVOLVED UNIVERSAL TERRESTRIAL RADIO ACCESS NETWORK (E-UTRAN) V11.0.0. Using the same notation of the specification, the counter in this embodiment is the one in 4.1.2.4 within the section 4.1.2 as follows, marked with bold text.

4.1.2 RRC Connection Reestablishment

The three measurement types defined in the subclause 4.1.2.n are subject to the "2 out of 3 approach".

4.1.2.1 Attempted RRC Connection Reestablishments a) This measurement provides the number of RRC connection reestablishment attempts for each reestablishment cause.

b) CC.

c) Receipt of an RRCConnectionReestablishmentRequest message by the eNodeB/RN from the UE. Each RRCConnectionReestablishmentRequest received is added to the relevant per reestablishment cause measurement. The possible causes are included in TS 36.331 [8]. The sum of all supported per cause measurements shall equal the total number of RRC connection re-establishment attempts. In case only a subset of per cause measurements is supported, a sum subcounter will be provided first.

d) Each measurement is an integer value. The number of measurements is equal to the number of causes plus a possible sum value identified by the .sum suffix.

e) The measurement name has the form RRC.ConnReEstabAtt.Cause where Cause identifies the reestablishment cause.

f) EUtranCellFDD
   EUtranCellTDD g) Valid for packet switching.

h) EPS 4.1.2.2 Successful RRC Connection Reestablishments a) This measurement provides the number of successful RRC connection reestablishments for each reestablishment cause.

b) CC.

c) Receipt by the eNodeB/RN of an RRCConnectionReestablishmentComplete message following a RRC connection reestablishment request. Each RRCConnectionReestablishmentComplete message received is added to the relevant per reestablishment cause measurement. The possible causes are included in TS 36.331 [8]. The sum of all supported per cause measurements shall equal the total number of successful RRC connection reestablishments.

In case only a subset of per cause measurements is supported, a sum subcounter will be provided first.

d) Each measurement is an integer value. The number of measurements is equal to the number of causes plus a possible sum value identified by the .sum suffix.

e) The measurement name has the form of RRC.ConnReEstabSucc.Cause where Cause identifies the establishment cause.

f) EUtranCellFDD
EUtranCellTDD g) Valid for packet switching.

h) EPS 4.1.2.3 Failed RRC Connection Reestablishments a) This measurement provides the number of RRC reestablishment failures for each reestablishment cause.

b) CC.

c) Transmission of an RRCConnectionReestablishmentReject message by the eNodeB/RN to the UE or an expected RRCConnectionReestablishmentComplete message not received by the eNodeB/RN.

Each failed RRC connection reestablishment is added to the relevant per reestablishment.cause measurement.

The possible causes are included in TS 36.331 [8].

The sum of all supported per cause measurements shall equal the total number of RRC connection reestablishment failures. In case only a subset of per cause measurements is supported, a sub subcounter will be provided first.

d) Each measurement is an integer value. The number of measurements is equal to the number of causes plus a possible sum value identified by the .sum suffix.

e) The measurement name has the form of RRC.ConnReEstabFail.Cause where Cause identifies the reestablishment.cause.

f) EUtranCellFDD
EUtranCellTDD g) Valid for packet switching.

h) EPS 4.1.2.4 Discarded RFL Reports Information Followed by an RRC Connection Reestablishment a) This measurement provides the number of discarded Reestablishment Cell IEs within the RLF reports by the eNB when the ReestablishmentCellId in the VarRLF-report is not the same as the cell identity of the cell the UE is connected when the VarRLF-report is transmitted to E-UTRAN.

cause b) CC.

c) Reception of a VarRLF-report by the UE within one of the following messages RRCConnectionReestablishmentComplete, RRCConnectionReconfigurationComplete, RRCConnectionSetupComplete and, the ReestablishmentCellId in the VarRLF-report has a different value compared to the C-RNTI in one of these RRC messages.

d) Each measurement is an integer value. The number of measurements is equal to the number of causes plus a possible sum value identified by the .sum suffix.

e) The measurement name has the form RRC.DiscardedRLFReport f) EUtranRelation g) Valid for packet switching.

h) EPS

Figure 10:
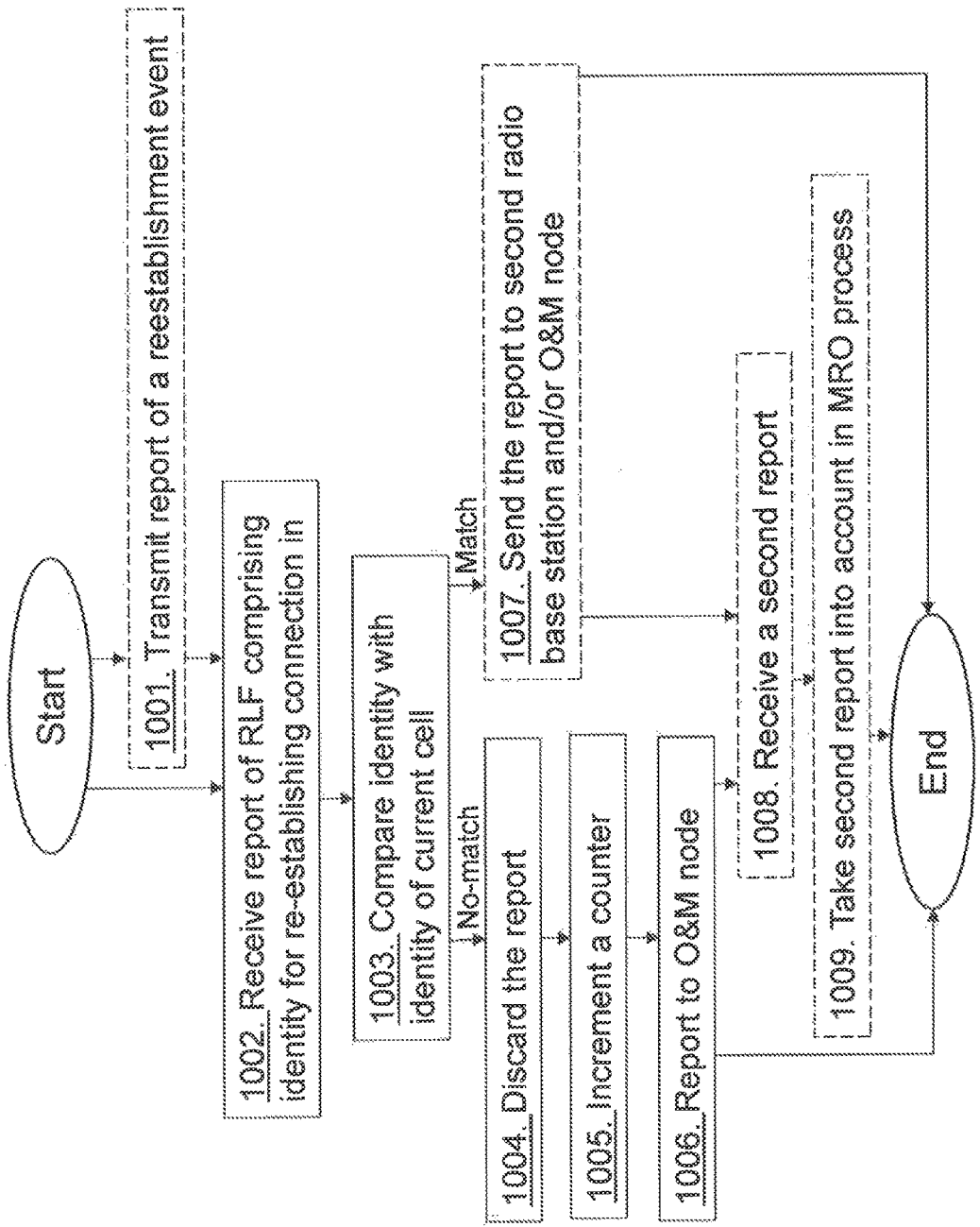
FIG. 10 is a flowchart of a method in a first radio base station according to embodiments herein.

The method actions performed in the first radio base station 12 for handling communication in the radio communications network 1 according to some embodiments will now be described with reference to a flowchart depicted in FIG. 10. The actions do not have to be taken in the order stated below, but may be taken in any suitable order. Actions performed in some embodiments are marked with dashed boxes. The first radio base station 12 is comprised in the radio communications network 1.

Action 1001. The first radio base station 12 may transmit a report of a reestablishment event to the O&M node 15 when performing a reestablishment procedure towards a cell of reestablishment, may e.g. be the first cell 11 or another cell. This may be triggered by receiving a RRConnectionReestablishmentRequest, a RRConnectionReestablishmentComplete, or a RRConnectionReestablishmentReject.

Action 1002. The first radio base station 12 receives from the wireless device 10, a report of an RLF of the wireless device 10, which report comprises an identity of the first cell 11 for re-establishing connection in.

Action 1003. The first radio base station 12 compares the identity of the first cell 11 in the received report with a cell identity of a current cell the wireless device 10 is currently connected to.

In case the identities do not match, the first radio base station 12 performs actions 1004-1006.

Action 1004. The first radio base station 12 discards the report of an RLF. The first radio base station 12 may discard the report of an RLF when not fulfilling at least one of the following conditions: the wireless device 10 first tried to connect to another cell of the first radio base station 12 previously, but was rejected; and the wireless device 10 connected successfully to another cell of the first radio base station 12 but an RLF-report was not requested.

Action 1005. The first radio base station 12 increments a counter counting a number of times that the first cell 11 was reported as a reestablishment cell and not being a current cell to which the wireless device 10 is currently connected to.

Action 1006. The first radio base station 12 reports a report of an event to the O&M node 15, which report of an event comprises the number of the counter. The report of an event may comprise one or more of the following information: i) a time stamp of the event, ii) a cell identity of a reestablishment attempt at the report of RLF, iii) a cell identity where the report was received and iv) an identity of the wireless device 10.

In case the compared identities match, the first radio base station 12 performs action 1007.

Action 1007. The first radio base station 12 may further send the received report of an RLF to the second radio base station 13 and/or the O&M node 15.

Action 1008. The first radio base station 12 may receive a second report of an event from the O&M node 15. The second report of an event comprises a result of a correlation of the reported report of an event, action 1006, with the transmitted report of a reestablishment event, action 1001.

Action 1009. The first radio base station 12 may then take the second report into account in a MRO process.

Figure 11:
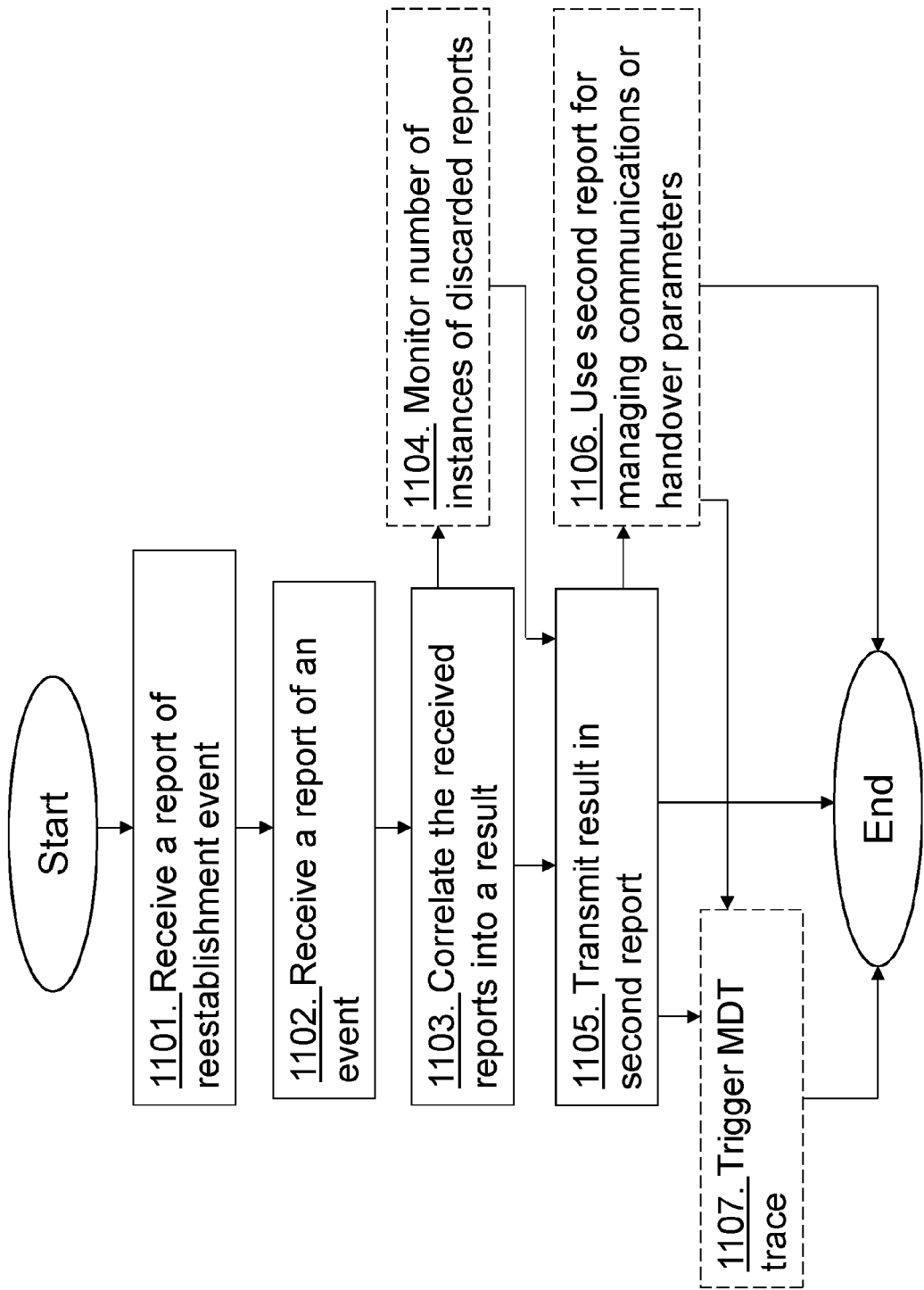
FIG. 11 is a flowchart of a method in a O&M node according to embodiments herein.

The method actions performed in the O&M node 15 for managing communication or handover parameters in the radio communications network 1 according to some embodiments will now be described with reference to a flowchart depicted in FIG. 11. The actions do not have to be taken in the order stated below, but may be taken in any suitable order. Actions performed in some embodiments are marked with dashed boxes. The radio communications network 1 comprises the first radio base station 12 and the second radio base station 13.

Action 1101. The O&M node 15 receives a report of a reestablishment event from the first radio base station 12, which report of a reestablishment event indicates a reestablishment procedure of the wireless device 10 towards a cell of reestablishment, e.g. the first cell. The report of a reestablishment event may comprise one or more of the following: i) a time stamp of the reestablishment event, ii) a cell identity of a reestablishment attempt, iii) a result of the reestablishment indicating success or not.

Action 1102. The O&M node 15 receives a report of an event from the first radio base station 12. The report of an event relates to a radio link failure of the wireless device 10 and comprises a number of a counter counting a number of times that the first cell 11 was reported as a cell for re-establishing connection in and not being a current cell to which the wireless device 10 is currently connected to. The report of an event may comprise one or more of the following information: i) a time stamp of the event, ii) a cell identity of a reestablishment attempt at the report of radio link failure, iii) a cell identity where the report was received and iv) an identity of the wireless device (10).

Action 1103. The O&M node 15 correlates the received report of an event with the received report of a reestablishment event into a result. The result either being a match or a mismatch of the cells/times in the different reports.

Action 1104. The O&M node 15 may monitor number of instances of discarded reports per cell in the received report of an event taking the number of the counter into account.

Action 1105. The O&M node 15 transmits the result in a second report of an event to the second radio base station 13 associated with the radio link failure. E.g. when the number of instances in action 1104 exceeds a threshold the second report of an event is triggered and sent to the second radio base station 13 where the radio link failure originated. The second report of an event may comprise one or more of the following: i) a time of failure, ii) a cell ID, which cell is where the failure occurred, iii) an ordered list of cell identities where reestablishment attempts occurred after failure in cell of the radio link failure and before successful reconnection, iv) a list of results for these reestablishments.

Action 1106. The O&M node 15 may use the second report of an event for managing communications or handover parameters in the radio communications network.

Action 1107. The O&M node 15 may trigger, based on the number of instances and/or the second report, a Minimization of Drive Testing, MDT, trace of the wireless device 10 served by the first radio base station 10 serving the first cell 11.

To perform the methods herein a radio base station such as the first radio base station 12 and an O&M node such as the O&M node 15 are provided.

Figure 12:
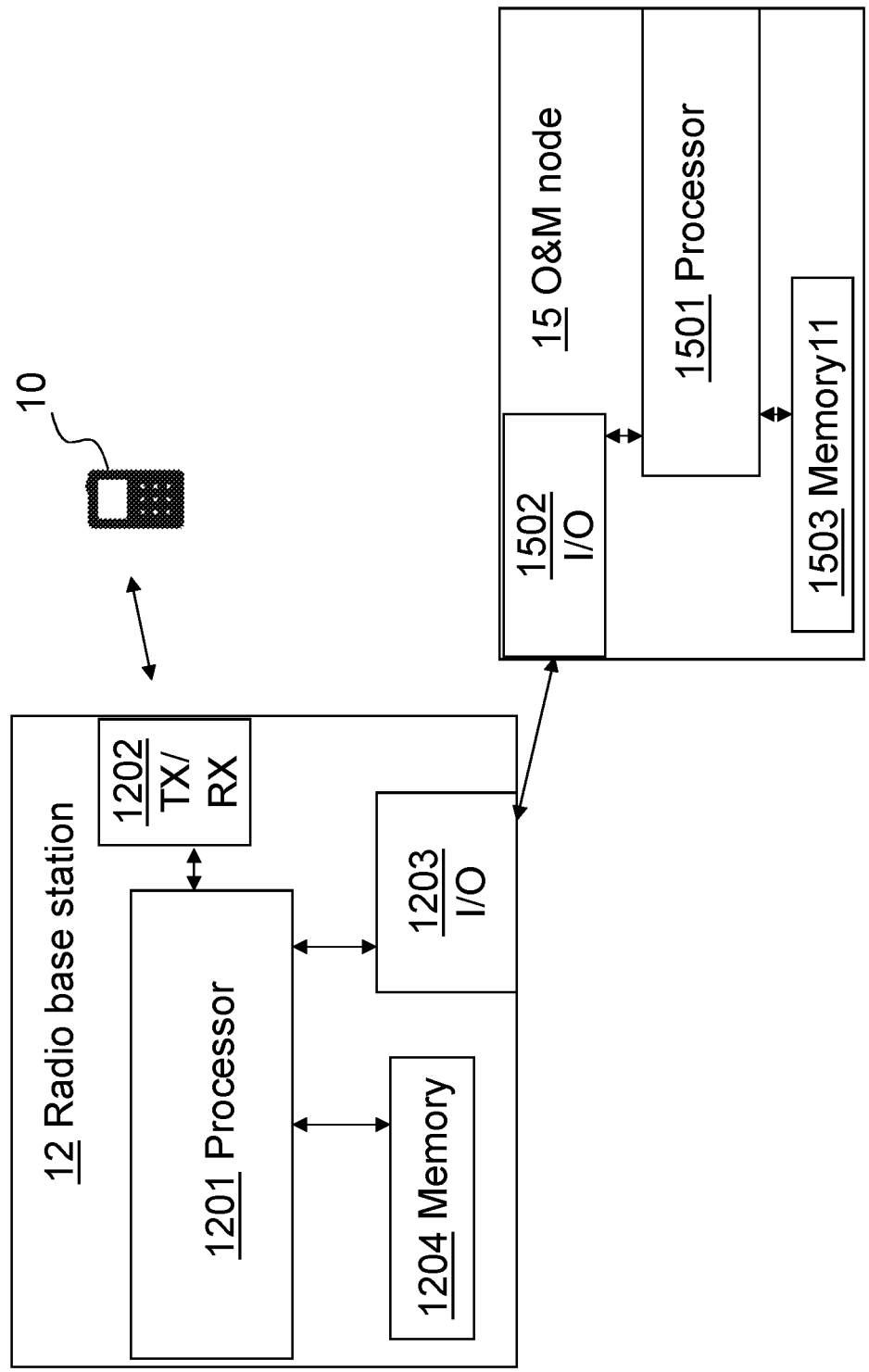
FIG. 12 is a block diagram depicting a first radio base station and a O&M node.

FIG. 12 is a block diagram depicting the first radio base station 12 and the O&M node 15. The first radio base station 12 is configured to perform the methods related to a radio base station according to embodiments herein. The O&M node 15 is configured to perform the methods related to an O&M node according to embodiments herein.

The embodiments herein for handling communications may be implemented through one or more processors 1201 in the first radio base station 12 depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the first radio base station 12. One such carrier may be in the form of a CD ROM disc. It is however feasible with other data carriers such as a memory stick. The computer program code may furthermore be provided as pure program code on a server and downloaded to the first radio base station 12.

The first radio base station 12 comprises a transmitter TX and a receiver RX, or a transceiver 1202, over which the first radio base station 12 receives reports of RLF from the wireless device 10.

The first radio base station 12 comprises an input/output (I/O) interface 1203 connecting to the O&M node 15. The first radio base station 12 may transmit event reports to the O&M node 15 over the I/O 1203.

The first radio base station 12 further comprises a memory 1204. The memory 1204 may be used to store cell IDs, number of instances of discarded reports, reports of RLF, event reports, applications to perform the methods herein etc.

The first radio base station 12 is configured to determine whether to take a cell into consideration in a MRO process based on a comparison of an identity of a reestablishment cell with an identity of a cell the wireless device 10 is currently connected to.

The embodiments herein for managing communications and or handover parameters may be implemented through one or more processors 1501 in the O&M node 15 depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the O&M node 15. One such carrier may be in the form of a CD ROM disc. It is however feasible with other data carriers such as a memory stick. The computer program code may furthermore be provided as pure program code on a server and downloaded to the O&M node 15.

The O&M node 15 comprises an input/output interface 1502. The O&M node 15 receives event reports and transmits second event reports over the I/O 1502.

The O&M node 15 further comprises a memory 1503. The memory 1203 may be used to store cell IDs, number of instances of discarded reports, reports of RLF, event reports, applications to perform the methods herein etc.

Figure 13:
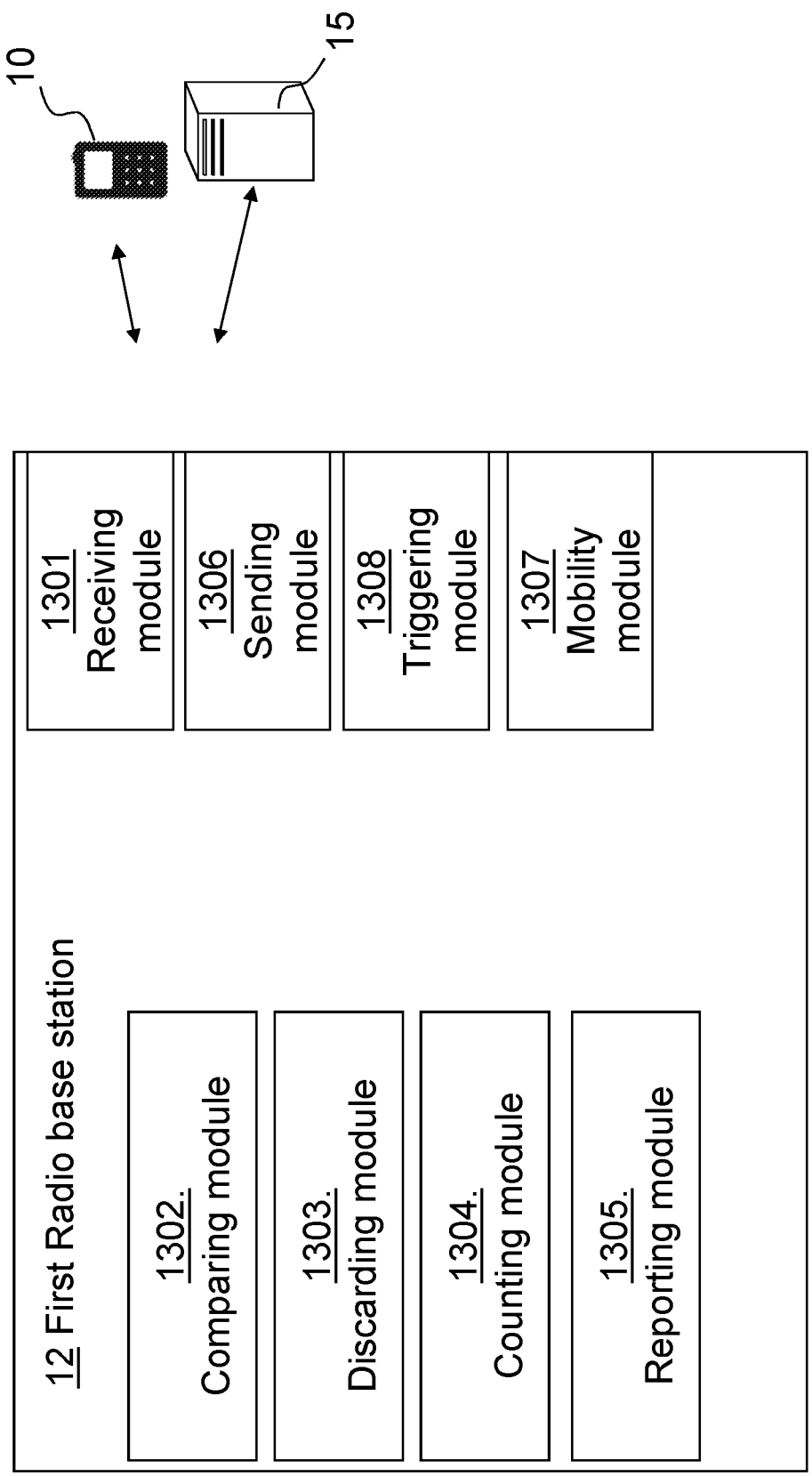
FIG. 13 is a block diagram depicting a first radio base station according to embodiments herein.

FIG. 13 shows the first radio base station 12 for handling communication in the radio communications network 1. The first radio base station 12 may comprise a receiving module 1301 such as a transceiver or a receiver. The first radio base station 12 and/or the receiving module 1301 may be configured to receive the report of the RLF of the wireless device 10, from the wireless device 10. The report comprises an identity of the first cell 11 for re-establishing connection in.

The first radio base station 12 may comprise a comparing module 1302. The first radio base station 12 and/or the comparing module 1302 may be configured to compare the identity of the first cell 11 in the received report with the cell identity of the current cell the wireless device 10 is currently connected to.

The first radio base station 12 may comprise a discarding module 1303, a counting module 1304, and/or a reporting module 1305. The first radio base station 12 and/or the discarding module 1303 may be configured to, in case the identities do not match, to discard the report of an RLF. Then the first radio base station 12 and/or the counting module 1304 may be configured to increment a counter counting a number of times that the first cell was reported as a reestablishment cell and not being a current cell to which the wireless device 10 is currently connected to. Furthermore, the first radio base station 12 and/or the reporting module 1305 may then be configured to report a report of an event to the O&M node 15, which report of an event comprises the number of the counter. The report of an event may comprise one or more of the following information: i) a time stamp of the event, ii) a cell identity of a reestablishment attempt at the report of RLF, iii) a cell identity where the report was received and iv) an identity of the wireless device 10.

The first radio base station 12 may comprise a sending module 1306. The first radio base station 12 and/or the sending module 1306 may be configured to send, in case the compared identities match, the received report of an RLF to the second radio base station 13 and/or the O&M node 15. The first radio base station 12 and/or the sending module 1306 may be configured to transmit a report of a reestablishment event to the O&M node 15 when performing a reestablishment procedure towards a cell of reestablishment.

The first radio base station 12 and/or the discarding module 1303 may be configured to discard the report of an RLF when not fulfilling at least one of the following conditions: the wireless device 10 first tried to connect to another cell of the first radio base station 12 previously, but was rejected; and the wireless device 10 connected successfully to another cell of the first radio base station 12 but an RLF-report was not requested.

The first radio base station 12 may comprise a mobility module 1307. The first radio base station 12 and/or the receiving module 1301 may be configured to receive a second report of an event from the O&M node 15, which second report of an event comprises a result of a correlation of the reported report of an event with the transmitted report of a reestablishment event. Then, the first radio base station 12 and/or the mobility module 1307 is configured to take the second report into account in a Mobility Robustness Optimization, MRO, process.

The first radio base station 12 may comprise a triggering module 1308. The first radio base station 12 and/or the triggering module 1308 may be configured to trigger the transmission of the second report when receiving a RRConnectionReestablishmentRequest, a RRConnectionReestablishmentComplete, or a RRConnectionReestablishmentReject.

Figure 14:
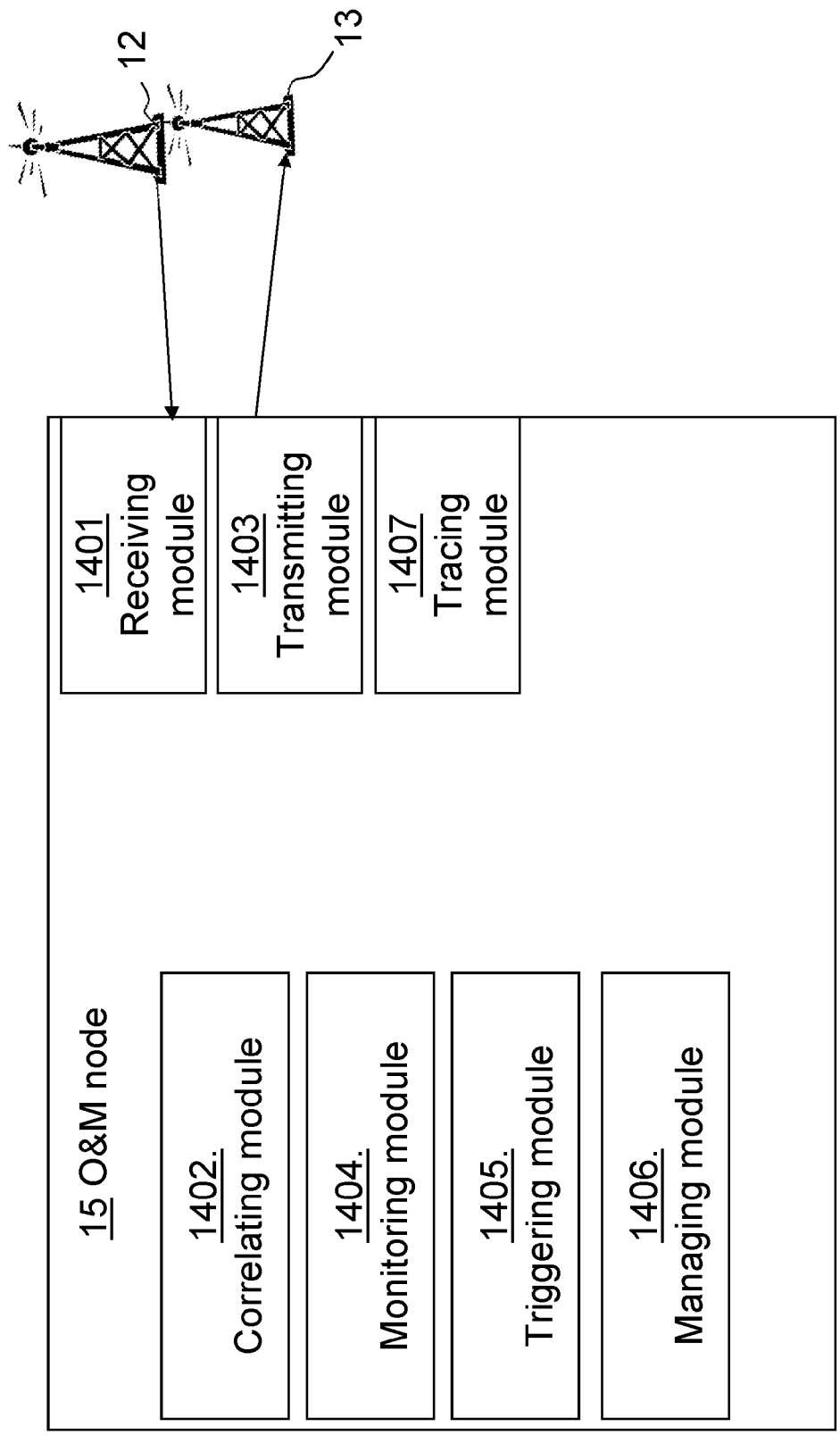
FIG. 14 is a block diagram depicting a O&M node according to embodiments herein.

FIG. 14 shows the Operation and Maintenance node 15 for managing communication or handover parameters in the radio communications network 1. The radio communications network 1 comprises the first radio base station 12 and the second radio base station 13.

The Operation and Maintenance node 15 may comprise a receiving module 1401. The Operation and Maintenance node 15 and/or the receiving module 1401 may be configured to receive a report of a reestablishment event from the first radio base station 12. The report of a reestablishment event indicates a reestablishment procedure from a wireless device 10 towards a cell of reestablishment. The report of a reestablishment event may comprise one or more of the following i) a time stamp of the reestablishment event, ii) a cell identity of a reestablishment attempt, iii) a result of the reestablishment indicating success or not. The Operation and Maintenance node 15 and/or the receiving module 1401 may further be configured to receive a report of an event from the first radio base station 12. The report of an event relates to a radio link failure of the wireless device 10 and comprises a number of a counter counting a number of times that the first cell 11 was reported as a cell for re-establishing connection in and not being the current cell to which the wireless device 10 is currently connected to. The report of an event may comprise one or more of the following information: i) a time stamp of the event, ii) a cell identity of a reestablishment attempt at the report of radio link failure, iii) a cell identity where the report was received and iv) an identity of the wireless device 10.

The Operation and Maintenance node 15 may comprise a correlating module 1402. The Operation and Maintenance node 15 and/or the correlating module 1402 may be configured to correlate the received report of an event with the received report of a reestablishment event into a result.

The Operation and Maintenance node 15 may comprise a transmitting module 1403. The Operation and Maintenance node 15 and/or the transmitting module 1403 may be configured to transmit the result in a second report of an event to the second radio base station 13 associated with the radio link failure. The second report of an event may comprise one or more of the following: i) a time of failure, ii) a cell ID, which cell is where the failure occurred, iii) an ordered list of cell identities where reestablishment attempts occurred after failure in cell of the radio link failure and before successful reconnection, iv) a list of results for these reestablishments.

The Operation and Maintenance node 15 may comprise a monitoring module 1404. The Operation and Maintenance node 15 and/or the monitoring module 1404 may be configured to monitor number of instances of discarded reports per cell in the received report of an event taking the number of the counter into account. The Operation and Maintenance node 15 may comprise a triggering module 1405. The Operation and Maintenance node 15 and/or the triggering module 1405 may be configured to, when the number of instances exceeds a threshold, trigger the second report of an event. The Operation and Maintenance node 15 and/or the transmitting module 1403 may then be configured to send the second report to the second radio base station 13 where the radio link failure originated.

The Operation and Maintenance node 15 may comprise a managing module 1406. The Operation and Maintenance node 15 and/or the managing module 1406 may be configured to use the second report of an event for managing communications or handover parameters in the radio communications network 1.

The Operation and Maintenance node 15 may comprise a tracing module 1407. The Operation and Maintenance node 15 and/or the tracing module 1407 may be configured to trigger a Minimization of Drive Testing, MDT, trace of the wireless device 10 served by the first radio base station 10 serving the first cell (11).

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices. The different actions taken by the different nodes may be implemented with different circuits.

According to an aspect it is herein provided a method in a first radio base station for handling communication in a radio communications network. The first radio base station 12 is comprised in the radio communications network. The first radio base station receives a report of a radio link failure, RLF, of a wireless device, which report comprises the identity of the reestablishment cell. The first radio base station 12 compares the identity of the reestablishment cell in the received report with the cell identity of the current cell the UE is connected to. The first radio base station 12 then performs an action based on the comparison, wherein the action is sending the received report to a second node, such as a second radio base station, in the case of a positive result of the comparison. The first radio base station 12 performs a different action when the comparison generates a negative result, e.g. excludes the cell in a Mobility Robustness Optimization analysis, may remove/modify the reestablishment cell information while still forwarding the RLF Report to the failure radio base station, and may discard the report. In some embodiments, the first radio base station 12 may not discard the report upon fulfilling at least one of the following conditions: the UE first tried to connect to another cell of the first radio base station 12 earlier, but was rejected; and the UE connected successfully to another cell in the first radio base station 12 but an RLF-report was not requested.

The first radio base station 12 reports an event to an O&M node The report may comprise one or more of the following information: i) time stamp, ii) cell identity of the reestablishment attempt, iii) result of the reestablishment which could be "successful", "rejected" or "probably failed" iv) reestablishment cell identity at the RLF report v) cell identity where the report was received and vi) user equipment identity. This may in some embodiments be triggered by receiving a RRConnectionReestablishmentRequest, a RRConnectionReestablishmentComplete, or a RRConnectionReestablishmentReject.

According to another aspect the object is achieved by providing a method in an operation support system node for managing communication or handover parameters in a radio communications network. The O&M node receives an event report from a radio base station. The event report may comprise one or more of the following information: i) time stamp, ii) cell identity of the reestablishment attempt, iii) result of the reestablishment which could be "successful", "rejected" or "probably failed" iv) reestablishment cell identity at the RLF report v) cell identity where the report was received and vi) user equipment identity. The O&M node then creates a second event report. The second event report comprise one or more of the following: i) time of failure, ii) cell where the failure occurred, iii) ordered list of cell identities where reestablishment attempts occurred after failure in failure cell and before successful reconnection, iv) list of results for these reestablishments (e.g. successful, rejected). The second event report is used for managing communications or handover parameters in e.g. the O&M node, another Operation and Maintenance (O&M) node or a Network Management System (NMS) node or sent to a radio base station to be taken into account in a Mobility Robustness Optimization (MRO) process.

In some embodiments the O&M node monitors the number of instances of discarded RLF reports per cell or discarded/modified Reestablishment cells in the RLF Report. When the number exceeds a threshold the O&M node may send to a radio base station where the RLF has been originated the second report. The first radio base station 12 receives this information and takes that into account when performing MRO process, and/or the O&M node trigger Minimization of Drive Testing (MDT) trace of UEs served by the first radio base station 12 serving the cell of reestablishment failure.

A first radio base station 12 and an O&M node 15 configured to perform the methods herein are also provided.

Embodiments herein relate to a network based solution with minimal standard impact and enhancing O&M features.

Some advantages of embodiments herein are to enable a correct decision on whether to run an MRO process, at the radio base station, on certain reestablishment cells and eventually adjust mobility parameters towards such cells or whether simply ignore those reestablishment cells because they do not represent reliable candidate cells for reestablishment and therefore for mobility.

The solution is network based, i.e. it has no UE impact. Because of being network based this solution may also work with legacy UEs, e.g. UEs not supporting RLF Reporting or not supporting some of the RLF Report enhancements agreed in latest releases.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed in a first radio base station for handling communication in a radio communications network, which first radio base station is comprised in the radio communications network, comprising:
   by the first radio base station, receiving a report of a radio link failure, RLF, of a wireless device, from the wireless device, which report comprises an identity of a first cell for re-establishing connection in;
   by the first radio base station, comparing the identity of the first cell in the received report with a cell identity of a current cell the wireless device is currently connected to; and
   by the first radio base station, in response to determining that the identities do not match, discarding the report of an RLF, incrementing a counter counting a number of times that the first cell was reported as a reestablishment cell and not being a current cell to which the wireless device is currently connected to; and
   by the first radio base station, transmitting a report of an event to an Operation and Maintenance, O&M, node, which report of the event comprises the number of the counter.

2. A method according to claim 1, comprising, in case the compared identities match,
   sending the received report of an RLF to a second radio base station and/or the O&M node.

3. A method according to claim 1, wherein the discarding is performed when not fulfilling at least one of the following conditions: the wireless device first tried to connect to another cell of the first radio base station previously, but was rejected; and the wireless device connected successfully to another cell of the first radio base station but an RLF-report was not requested.

4. A method according to claim 1, wherein the report of an event comprises one or more of the following information: i) a time stamp of the event, ii) a cell identity of a reestablishment attempt at the report of an RLF, iii) a cell identity where the report was received and iv) an identity of the wireless device.

5. A method according to claim 1, further comprising
   transmitting a report of a reestablishment event to the O&M node when performing a reestablishment procedure towards a cell of reestablishment.

6. A method according to claim 5, further comprising
   receiving a second report of an event from the O&M node, which second report of an event comprises a result of a correlation of the reported report of an event with the transmitted report of a reestablishment event, and
   taking the second report into account in a Mobility Robustness Optimization, MRO, process.

7. A method according to claim 5, wherein the transmitting is being triggered by receiving a RRConnectionReestablishmentRequest, a RRConnectionReestablishmentComplete, or a RRConnectionReestablishmentReject.

8. A method performed in an Operation and Maintenance node for managing communication or handover parameters in a radio communications network, which radio communications network comprises a first radio base station and a second radio base station; comprising
   by the Operation and Maintenance node, receiving a report of a reestablishment event from the first radio base station, which report of a reestablishment event indicates a reestablishment procedure from a wireless device towards a cell of reestablishment;
   by the Operation and Maintenance node, receiving a report of an event from the first radio base station, which report of an event relates to a radio link failure of the wireless device and comprises a number of a counter counting a number of times that a first cell was reported as a cell for reestablishing connection in and not being a current cell to which the wireless device is currently connected to;
   by the Operation and Maintenance node, correlating the received report of an event with the received report of a reestablishment event into a result; and
   by the Operation and Maintenance node, transmitting the result in a second report of an event to the second radio base station associated with the radio link failure.

9. A method according to claim 8, further comprising
   monitoring number of instances of discarded reports per cell in the received report of an event taking the number of the counter into account, and when the number of instances exceeds a threshold the second report of an event is triggered and sent to the second radio base station where the radio link failure originated.

10. A method according to claim 8 wherein the report of a reestablishment event comprises one or more of the following i) a time stamp of the reestablishment event, ii) a cell identity of a reestablishment attempt, iii) a result of the reestablishment indicating success or not.

11. A method according to claim 8, wherein the report of an event comprises one or more of the following information: i) a time stamp of the event, ii) a cell identity of a reestablishment attempt at the report of radio link failure, iii) a cell identity where the report was received and iv) an identity of the wireless device.

12. A method according to claim 8, wherein the second report of an event comprises one or more of the following: i) a time of failure, ii) a cell ID, which cell is where the failure occurred, iii) an ordered list of cell identities where reestablishment attempts occurred after failure in cell of the radio link failure and before successful reconnection, iv) a list of results for these reestablishments.

13. A method according to claim 8, further comprising
   using the second report of an event for managing communications or handover parameters in the radio communications network.

14. A method according to claim 8, further comprising
   triggering a Minimization of Drive Testing, MDT, trace of the wireless device served by the first radio base station serving the first cell.

15. A first radio base station for handling communication in a radio communications network, wherein the first radio base station comprises:
  memory storing computer program code; and
  one or more processors operable to execute the computer program code to cause the first radio base station to:
    receive a report of a radio link failure, RLF, of a wireless device, from the wireless device, which report comprises an identity of a first cell for re-establishing connection in;
    compare the identity of the first cell in the received report with a cell identity of a current cell the wireless device is currently connected to; and
      in response to determining that the identities do not match, being configured to discard the report of an RLF, increment a counter counting a number of times that the first cell was reported as a reestablishment cell and not being a current cell to which the wireless device is currently connected to, and to report a report of an event to an Operation and Maintenance, O&M, node, which report of an event comprises the number of the counter.

16. A first radio base station according to claim 15, being configured to, in case the compared identities match, send the received report of an RLF to a second radio base station and/or the O&M node.

17. A first radio base station according to claim 15, being configured to discard the report of an RLF when not fulfilling at least one of the following conditions: the wireless device first tried to connect to another cell of the first radio base station previously, but was rejected; and the wireless device connected successfully to another cell of the first radio base station but an RLF-report was not requested.

18. A first radio base station according to claim 15, wherein the report of an event comprises one or more of the following information: i) a time stamp of the event, ii) a cell identity of a reestablishment attempt at the report of RLF, iii) a cell identity where the report was received and iv) an identity of the wireless device.

19. A first radio base station according to claim 15, further being configured to transmit a report of a reestablishment event to the O&M node when performing a reestablishment procedure towards a cell of reestablishment.

20. A first radio base station according to claim 19, further being configured to
  receive a second report of an event from the O&M node, which second report of an event comprises a result of a correlation of the reported report of an event with the transmitted report of a reestablishment event, and to
  take the second report into account in a Mobility Robustness Optimization, MRO, process.

21. A first radio base station according to claim 19, further being configure to trigger the transmission of the second report when receiving a RRConnectionReestablishmentRequest, a RRConnectionReestablishmentComplete, or a RRConnectionReestablishmentReject.

22. An Operation and Maintenance node for managing communication or handover parameters in a radio communications network, which radio communications network comprises a first radio base station and a second radio base station; the Operation and Maintenance node comprising:
  memory storing computer program code; and
  one or more processors operable to execute the computer program code to cause the first radio base station to:
    receive a report of a reestablishment event from the first radio base station, which report of a reestablishment event indicates a reestablishment procedure from a wireless device towards a cell of reestablishment;
    receive a report of an event from the first radio base station, which report of an event relates to a radio link failure of the wireless device and comprises a number of a counter counting a number of times that a first cell (was reported as a cell for re-establishing connection in and not being a current cell to which the wireless device is currently connected to;
    correlate the received report of an event with the received report of a reestablishment event into a result; and
    transmit the result in a second report of an event to the second radio base station associated with the radio link failure.

23. An Operation and Maintenance node according to claim 22, further being configured to
  monitor number of instances of discarded reports per cell in the received report of an event taking the number of the counter into account, and when the number of instances exceeds a threshold further being configured to trigger the second report of an event and to send the second report to the second radio base station where the radio link failure originated.

24. An Operation and Maintenance node according to claim 22, wherein the report of a reestablishment event comprises one or more of the following i) a time stamp of the reestablishment event, ii) a cell identity of a reestablishment attempt, iii) a result of the reestablishment indicating success or not.

25. An Operation and Maintenance node according to claim 22, wherein the report of an event comprises one or more of the following information: i) a time stamp of the event, ii) a cell identity of a reestablishment attempt at the report of radio link failure, iii) a cell identity where the report was received and iv) an identity of the wireless device.

26. An Operation and Maintenance node according to claim 22, wherein the second report of an event comprises one or more of the following: i) a time of failure, ii) a cell ID, which cell is where the failure occurred, iii) an ordered list of cell identities where reestablishment attempts occurred after failure in cell of the radio link failure and before successful reconnection, iv) a list of results for these reestablishments.

27. An Operation and Maintenance node according to claim 22, further being configured to
  use the second report of an event for managing communications or handover parameters in the radio communications network.

28. An Operation and Maintenance node according to claim 22, further being configured to
  trigger a Minimization of Drive Testing, MDT, trace of the wireless device served by the first radio base station serving the first cell.

* * * * *